(12) United States Patent
Gage

(10) Patent No.: US 11,039,309 B2
(45) Date of Patent: Jun. 15, 2021

(54) USER PLANE SECURITY FOR DISAGGREGATED RAN NODES

(71) Applicant: William Anthony Gage, Stittsville (CA)

(72) Inventor: William Anthony Gage, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 212 days.

(21) Appl. No.: 16/273,378

(22) Filed: Feb. 12, 2019

(65) Prior Publication Data
US 2019/0253881 A1 Aug. 15, 2019

Related U.S. Application Data

(60) Provisional application No. 62/631,036, filed on Feb. 15, 2018.

(51) Int. Cl.
| | |
|---|---|
| *H04W 12/033* | (2021.01) |
| *H04W 76/27* | (2018.01) |
| *H04W 80/08* | (2009.01) |
| *H04W 12/04* | (2021.01) |
| *H04W 12/03* | (2021.01) |

(Continued)

(52) U.S. Cl.
CPC ......... *H04W 12/033* (2021.01); *H04W 12/03* (2021.01); *H04W 12/04* (2013.01); *H04W 12/041* (2021.01); *H04W 12/0433* (2021.01); *H04W 76/27* (2018.02); *H04W 80/08* (2013.01)

(58) Field of Classification Search
CPC ............. H04W 12/0013; H04W 12/04; H04W 12/001; H04W 12/04033; H04W 76/27; H04W 80/08; H04W 12/0401; H04W 80/02
See application file for complete search history.

(56) References Cited

U.S. PATENT DOCUMENTS

| | | | |
|---|---|---|---|
| 2010/0202476 A1* | 8/2010 | Chun ................... | H04W 28/06 370/477 |
| 2013/0070925 A1* | 3/2013 | Yamada ................... | H04L 9/08 380/255 |

(Continued)

OTHER PUBLICATIONS

Huawei, Discussions on Security handling for CP-UP Separation, 3GPP TSG-RAN3 Meeting # 98, Reno, Nevada, US, Nov. 27-Dec. 1, 2017, R3-174467, 4 pages.

(Continued)

*Primary Examiner* — Will W Lin

(57) ABSTRACT

A method of coordinating a change in cryptographic key sets from a first cryptographic key set to a second cryptographic key set between a radio access network (RAN) node and a wireless device (WD) served by the RAN node. The RAN node includes a user plane (UP) component and a control plane (CP) component. The method includes transmitting, from the UP component to the wireless device (WD), a key change indicator indicative of changeover to the second cryptographic key set, the key change indicator included in one of a data protocol data unit (PDU) and a control PDU; and subsequently cryptographically encoding PDUs for transmission to the WD and cryptographically decoding PDUs received from the WD in accordance with the second cryptographic key set.

26 Claims, 17 Drawing Sheets

(51) Int. Cl.
*H04W 12/041* (2021.01)
*H04W 12/0433* (2021.01)

(56) References Cited

U.S. PATENT DOCUMENTS

| | | | | |
|---|---|---|---|---|
| 2015/0264359 | A1* | 9/2015 | Vanam | H04N 19/46 375/240.27 |
| 2016/0241685 | A1* | 8/2016 | Shah | H04L 69/40 |
| 2017/0171748 | A1* | 6/2017 | Deng | H04W 76/30 |
| 2017/0214489 | A1* | 7/2017 | Jiang | H04L 1/0041 |
| 2017/0215225 | A1* | 7/2017 | Yi | H04W 12/0017 |
| 2018/0041930 | A1* | 2/2018 | Hampel | H04W 84/12 |
| 2018/0083688 | A1* | 3/2018 | Agiwal | H04M 3/42229 |
| 2018/0352482 | A1 | 12/2018 | Gage et al. | |
| 2019/0387496 | A1* | 12/2019 | Liu | H04W 68/02 |
| 2020/0169887 | A1* | 5/2020 | Wager | H04W 12/1006 |
| 2020/0196374 | A1* | 6/2020 | Lim | H04W 76/27 |

OTHER PUBLICATIONS

Ericsson, Security for CP-UP Separation, 3GPP TSG-RAN WG3 Meeting #98, Reno, NV, U.S., Nov. 27-Dec. 1, 2017, R3-174838, 3 pages.

"Security architecture and procedures for 5G system"; 3GPP TS 33.501 V0.7.0 (Jan. 2018).
"E-UTRA and NR; Service Data Adaptation Protocol (SDAP) specification"; 3GPP TS 37.324 V1.1.1 (Nov. 2017).
"Evolved Universal Terrestrial Radio Access (E-UTRA) and NR; Multi-connectivity; Stage 2"; 3GPP TS 37.340 V15.0.0 (Dec. 2017).
"NR; NR and NG-RAN Overall Description; Stage 2"; 3GPP TS 38.300 V15.0.0 (Dec. 2017).
"NR; Medium Access Control (MAC) protocol specification"; 3GPP TS 38.321 V15.0.0 (Dec. 2017).
"NR; Radio Link Control (RLC) protocol specification"; 3GPP TS 38.322 V15.0.0 (Dec. 2017).
"NR; Packet Data Convergence Protocol (PDCP) specification"; 3GPP TS 38.323 V15.0.0 (Dec. 2017).
"NR; Radio Resource Control (RRC) protocol specification"; 3GPP TS 38.331 V15.0.0 (Dec. 2017).
"NG-RAN; Architecture description"; 3GPP TS 38.401 V15.0.0 (Dec. 2017).
"NG-RAN; Xn application protocol (XnAP)"; 3GPP TS 38.423 V0.6.0 (Jan. 2018).
"NG-RAN; NR user plane protocol"; 3GPP TS 38.425 V15.0.0 (Dec. 2017).

* cited by examiner

USER PLANE SECURITY FOR DISAGGREGATED RAN NODES

CROSS-REFERENCE TO RELATED APPLICATIONS

This application claims priority to U.S. Provisional Application Ser. No. 62/631,036 filed Feb. 15, 2018, the contents of which are hereby incorporated by reference.

TECHNICAL FIELD

The present disclosure relates to wireless communications and particular embodiments or aspects relate to mechanism for coordinating communications in a disaggregated, geographically dispersed radio access network (RAN) node in accordance therewith.

BACKGROUND

Conventionally, the control plane (CP) and user plane (UP) entities responsible for device-related cryptographic operations within a RAN are co-located within the same physical network element where the delays in signalling between the CP entity and the UP entity are negligible. However, if the CP entity and the UP entity are located in different physical network elements, the signalling delays may no longer be negligible and may affect interaction with a wireless device (WD) in radio communication with the RAN node.

In the present disclosure, a RAN node may be, without limitation, an access point (AP), base station, Node-B, evolved Node-B (eNB), a fifth generation new radio (5G NR) Node-B (known as a gNB), a next generation eNB (ng-eNB), a centralised unit (CU), a distributed unit (DU) and/or another form of radio access controller that is described below.

In the present disclosure, a WD may be, without limitation, a user equipment (UE), a human-type communications (HTC) device, a machine-type communications (MTC) device, a fixed station, a mobile station and/or another untethered communication device described below.

The dispersion of RAN node functions to different physical network elements results in a disaggregated RAN node and may introduce delays in communicating over the intra-RAN network in addition to delays encountered in communicating over a radio link to the WD.

In particular, in a disaggregated RAN node, negotiation of cryptographic parameters is performed by CP functions (CPFs) in the WD and in the RAN node CP entity. The UP cryptographic keys resulting from such negotiation are then communicated from the RAN node CP entity to the RAN node UP entity, which may be located in a different physical network element.

Occasionally the UP cryptographic keys to be used by the WD and the RAN node UP entity are to be changed, due, by way of non-limiting example, to WD mobility, expiration of a timer, and/or to exhaustion of a COUNT parameter used in cryptographic operations associated with the key. Conventionally, renegotiation of the UP cryptographic keys is performed by the CPFs in the WD and in the RAN node CP entity.

Meanwhile, ongoing uplink (UL) UP traffic (referring to UP transmissions from the WD) and downlink (DL) UP traffic (referring to UP transmissions to the WD) conveyed between the WD and the RAN node UP entity continues in parallel, using the older generation of cryptographic keys. In an aggregated RAN node, where the RAN node CP entity and RAN node UP entity are co-located within the same physical network element, the changeover from an older generation of UP keys to a newer generation of UP keys is easily synchronised with the conclusion of the CP transaction between the WD and the RAN node CP/UP entity.

However, in a disaggregated RAN node, there may be delays associated with communicating over the intra-RAN network between the RAN node CP entity and the RAN node UP entity.

In some examples, transmission of UP traffic may be suspended during the interval in which the exchange of new keying material between the RAN node CP entity and the RAN node UP entity is completed. This may affect the jitter and delay associated with delivering UP traffic and may cause a disruption in the end-to-end quality of service (QoS).

In some examples, an intra-cell handover procedure may be used to initiate derivation of new keys and to synchronise use of such new keys between the WD and the RAN. During the handover, transmission of UP traffic may be suspended, producing a similar result with similar issues as discussed immediately above.

Accordingly, there may be a need for mechanisms to synchronise cryptographic operations in the WD and in RAN node UP entities of a disaggregated, geographically dispersed RAN node to effect the changeover from an older generation of UP cryptographic keys to a newer generation of UP keys and to generally coordinate use of cryptographic UP keys used by both the WD and the RAN node UP entity that is not subject to one or more limitations of the prior art.

This background is intended to provide information that may be of possible relevance to the present invention. No admission is necessarily intended, nor should be construed, that any of the preceding information constitutes prior art against the present invention.

SUMMARY

It is an object of the present disclosure to obviate or mitigate at least one disadvantage of the prior art. It is another object of the present disclosure to provide a method and apparatus for managing cryptographic key changes in a wireless communication environment comprising a disaggregated RAN node, having differently located CP and UP components.

According to a broad aspect of the present invention, there is provided a method of coordinating a change in cryptographic key sets from a first cryptographic key set to a second cryptographic key set between a radio access network (RAN) node and a wireless device (WD) served by the RAN node. The RAN node includes a user plane (UP) component and a control plane (CP) component. The method, executed in a processor of the user plane (UP) component, comprises transmitting, from the UP component to the wireless device (WD), a key change indicator indicative of changeover to the second cryptographic key set, the key change indicator included in one of a data protocol data unit (PDU) and a control PDU, and subsequently cryptographically encoding PDUs for transmission to the WD and cryptographically decoding PDUs received from the WD in accordance with the second cryptographic key set.

According to another broad aspect of the present invention, there is disclosed a network element comprising a user plane (UP) component of a radio access network (RAN) node serving a wireless device (WD). The RAN node also includes a control plane (CP) component. The network element comprises a processor and a non-transitory memory storing instructions that when executed by the processor cause the UP component to coordinate a change in cryptographic key sets from a first cryptographic key set to a second cryptographic key set by transmitting, to the WD, a key change indicator indicative of changeover to the second cryptographic key set, the key change indicator included in one of a data protocol data unit (PDU) and a control PDU, and subsequently cryptographically encoding PDUs for transmission to the WD and cryptographically decoding PDUs received from the WD in accordance with the second cryptographic key set.

In another aspect, the key change indicator comprises the data PDU and a key set identifier indicative of the second cryptographic key set included in a header field of the data PDU.

In another aspect, the key change indicator comprises the control PDU and an indication of sequence numbers of data PDUs protected with the first cryptographic key set and sequence numbers of data PDUs protected with the second cryptographic key set.

In another aspect, the key change indicator comprises a pre-determined sequence number in a sequence number field of the data PDU, the data PDU interposed as a marker between data PDUs associated with the first cryptographic key set and data PDUs to be associated with the second cryptographic key set.

In another aspect of the invention, the cryptographically encoding and cryptographically decoding in accordance with the second cryptographic key set is performed only upon receipt of a key change command from the WD indicating that the change in cryptographic key sets has been completed.

In another aspect, prior to transmitting the key change indicator, the UP component is configured to receive, from the CP component, cryptographic keying material related to the second cryptographic key set.

In another aspect, the UP component derives the second cryptographic key set based on an intermediate master key provided by the CP network component and autonomously coordinates the changeover to the second cryptographic key set with the WD.

In another aspect, the UP component receives the second cryptographic key set from the CP component, and the UP component and the WD are responsive to coordination, by the CP component, of the changeover to the second cryptographic key set.

In another aspect, the UP component receives multiple sets of cryptographic keys derived by and sent from the CP component, and the UP component autonomously coordinates the changeover to the second cryptographic key set with the WD In another aspect, the UP component further comprises instructions executable in the processor to transmit, to the CP component, an indication that the UP component has activated the second cryptographic key set.

According to another broad aspect of the invention, there is disclosed a wireless device (WD) for exchanging protocol data units (PDUs) with a radio access network (RAN) node of a communication network. The WD comprises a processor, and a non-transient memory storing instructions. The instructions are executable in the processor to coordinate a change from a first cryptographic key set to a second cryptographic key set by receiving, from the RAN node, a key change indicator indicative of changeover to the second cryptographic key set, the key change indicator and included in one of a data protocol data unit (PDU) and a control PDU, activating the second cryptographic key set in accordance with the key change indicator, and cryptographically encoding PDUs for transmission to a UP component of the RAN node and cryptographically decoding PDUs received from the UP component of the RAN node in accordance with the second cryptographic key set.

In another aspect, the key change indicator comprises the data PDU and a key set identifier indicative of the second cryptographic key set included in a header field of the data PDU.

In another aspect, the key change indicator may be included in the control PDU and an indication of sequence numbers of data PDUs protected with the first cryptographic key set and sequence numbers of data PDUs protected with the second cryptographic key set.

In another aspect, the key change indicator may be included in a pre-determined sequence number in a sequence number field of the data PDU, the data PDU interposed as a marker between data PDUs associated with the first cryptographic key set and data PDUs to be associated with the second cryptographic key set. In one aspect of the invention, the activating comprises initializing a new packet data convergence protocol (PDCP) instance with the second cryptographic key set.

In another aspect, the WD receives the key change indicator from one of the UP component and the CP component of the RAN node.

In another aspect, the activating comprises sending a confirmatory PDU to the CP component indicating that the WD has derived the keys associated with the second cryptographic key set.

According to another broad aspect of the present disclosure, there is disclosed a method for coordinating a change in cryptographic key sets for cryptographically protecting protocol data units (PDUs) exchanged along a network between a WD and a network node. The network node has a CP component and a UP component. The PDUs exchanged between the UP component and the WD are cryptographically protected by a first cryptographic key set prior to the change. The method comprises actions at the WD, of receiving, from the network node, a cryptographic key change PDU comprising an indicator identifying a second cryptographic key set by which PDUs are to be cryptographically protected subsequently, deriving keys associated with the second cryptographic key set; activating the second cryptographic key set; and cryptographically encoding PDUs for transmission to the UP component and cryptographically decoding PDUs received from the UP component using keys associated with the second cryptographic key set. The PDUs may include the indicator identifying the second cryptographic key set.

In an embodiment, the action of activating can comprise initializing a new packet data convergence protocol (PDCP) instance with the second cryptographic key set.

In an embodiment, the CP component and the UP component can be located in physically different locations and communicating by exchanging PDUs along the network.

In an embodiment, the WD can receive the cryptographic key change PDU from the CP component.

In an embodiment, the action of activating can comprise sending a confirmatory PDU to the CP component indicating that the WD has derived the keys associated with the second cryptographic key set. In an embodiment, the CP component can send a PDU to the UP component upon receipt of the confirmatory PDU. In an embodiment, the method can comprise an action of receiving from the CP component, an indication that the UP component has activated the second cryptographic key set.

In an embodiment, the WD can receive the cryptographic key change PDU from the UP component. The cryptographic key change PDU may be a data PDU comprising a key identifier associated with the second cryptographic key set. The cryptographic key change PDU may be a data PDU comprising a pre-determined sequence number interposed between data PDUs associated with the first cryptographic key set and data PDUs associated with the second cryptographic key set. The cryptographic key change PDU may be a control PDU interposed between data PDUs associated with the first cryptographic key set and data PDUs associated with the second cryptographic key set.

According to another broad aspect of the present disclosure, there is disclosed a method for coordinating a change in cryptographic key sets for encrypting PDUs exchanged along a network between a WD and a network node. The network node has a CP component and a UP component. The PDUs exchanged between the UP component and the WD are cryptographically protected by a first cryptographic key set prior to the change. The method comprises actions at the UP component, of receiving from the CP component, cryptographic keying material related to a second cryptographic key set by which PDUs are to be cryptographically protected subsequently, cryptographically encoding PDUs for transmission to the WD and cryptographically decoding PDUs received from the WD using keys associated with the second cryptographic key set. The PDUs may include an indicator identifying the second cryptographic key set.

In an embodiment, the method further includes receiving, from the WD, a cryptographic key change PDU comprising an indicator identifying a second cryptographic key set by which PDUs are to be cryptographically protected subsequently. In an embodiment, the cryptographic key change PDU is a data PDU comprising a key identifier associated with the second cryptographic key set. In an embodiment, the cryptographic key change PDU is a data PDU comprising a pre-determined sequence number interposed between data PDUs associated with the first cryptographic key set and data PDUs associated with the second cryptographic key set. In an embodiment, the cryptographic key change PDU is a control PDU interposed between data PDUs associated with the first cryptographic key set and data PDUs associated with the second cryptographic key set.

In an embodiment, the CP component and the UP component can be located in physically different locations and communicate by exchanging PDUs along the network.

In an embodiment, the cryptographic keying material can comprise the second cryptographic key set, derived by the CP component, and the indicator associated therewith. In an embodiment, the cryptographic keying material can be received in a handover preparation message and the action of cryptographically encoding and cryptographically decoding can be performed only upon receipt of a key change command indicative that handover has been completed.

In an embodiment, the method can comprise, after receiving the cryptographic keying material, an action of determining that the change in cryptographic key sets is appropriate.

In an embodiment, the cryptographic keying material can comprise a plurality of cryptographic key sets, each with an identifier associated therewith, including the second cryptographic key set and the action of determining can comprise selecting the second cryptographic key set for the actions of cryptographically encoding and cryptographically decoding subsequent PDUs.

In an embodiment, the cryptographic keying material can comprise an intermediate UP key, and the action of determining can comprise deriving the second cryptographic key set and the indicator associated therewith from the intermediate UP key.

According to another broad aspect of the present disclosure, there is disclosed a WD for exchanging PDUs along a network with a network node. The network node has a CP component and a UP component. The WD comprises a processor and a non-transient memory. The non-transient memory is for storing instructions that when executed by the processor cause the WD to coordinate a change in cryptographic key sets for cryptographically protecting the PDUs exchanged between the WD and the UP component, being cryptographically protected by a first cryptographic key set prior to the change, by receiving, from the network node, a cryptographic key change PDU comprising an indicator identifying a second cryptographic key set by which PDUs are to be cryptographically protected subsequently, deriving keys associated with the second cryptographic key set, activating the second cryptographic key set, and cryptographically encoding PDUs for transmission to the UP component and cryptographically decoding PDUs received from the UP component using keys associated with the second cryptographic key set. The PDUs may include the indicator identifying the second cryptographic key set.

According to another broad aspect of the present disclosure, there is disclosed a UP network component in a network node in a network. The UP network component comprises a processor and a non-transient memory. The non-transient memory is for storing instructions that when executed by the processor, cause the UP network component to coordinate a change in cryptographic key sets for cryptographically protecting PDUs exchanged between the UP network component and a WD in the network, being cryptographically protected by a first cryptographic key set prior to the change, by receiving from a CP network component of the network node, cryptographic keying material related to a second cryptographic key set by which PDUs are to be cryptographically protected subsequently, and cryptographically encoding PDUs for transmission to the WD and cryptographically decoding PDUs received from the WD using keys associated with the second cryptographic key set. The PDUs may include an indicator identifying the second cryptographic key set.

Embodiments have been described above in conjunction with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art. In some embodiments, the UP network component and the CP network component are located in physically different locations and communicate by exchanging PDUs along the network. In some embodiments, the UP network component transmits a cryptographic key change PDU to the WD, the cryptographic key change PDU comprising an indicator that the second cryptographic key set is to be used for PDUs cryptographically protected subsequently.

BRIEF DESCRIPTION OF THE DRAWINGS

Example embodiments of the present disclosure will now be described by reference to the following figures, in which identical reference numerals in different figures indicate identical elements and in which.

Figure 1:
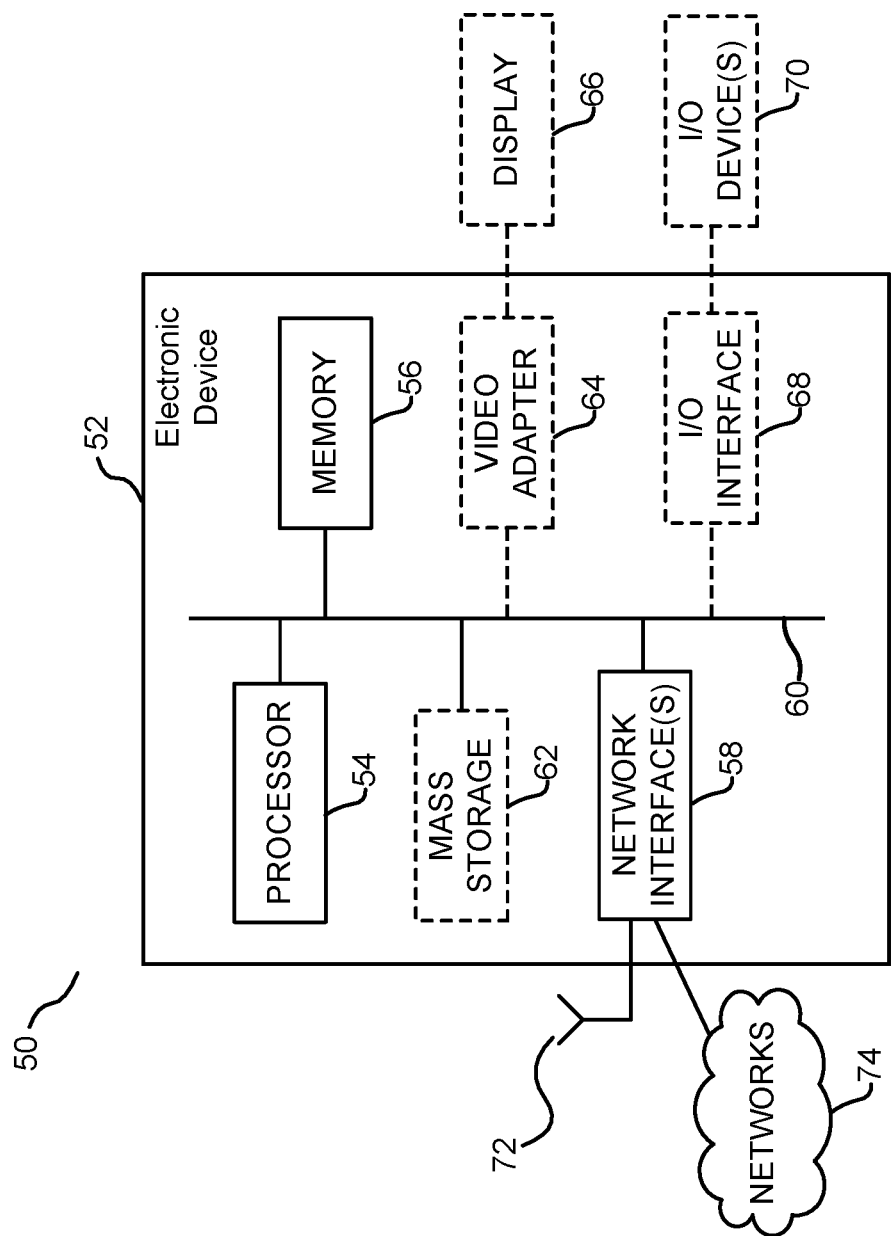
FIG. 1 is a block diagram of an electronic device within a computing and communications environment 50 that may be used for implementing devices and methods in accordance with representative embodiments of the present disclosure.

In the present disclosure, for purposes of explanation and not limitation, specific details are set forth in order to provide a thorough understanding of the present disclosure. In some instances, detailed descriptions of well-known devices, circuits and methods are omitted so as not to obscure the description of the present disclosure with unnecessary detail.

Accordingly, the system and method components have been represented where appropriate by conventional symbols in the drawings, showing only those specific details that are pertinent to understanding the embodiments of the present disclosure, so as not to obscure the disclosure with details that will be readily apparent to those of ordinary skill in the art having the benefit of the description herein.

Any feature or action shown in dashed outline may in some example embodiments be considered as optional.

DESCRIPTION

FIG. 1 is a block diagram of an electronic device (ED) 52 illustrated within a computing and communications environment 50 that may be used for implementing the devices and methods disclosed herein. In some embodiments, the ED 52 may be an element (e.g., a physical network element) of communications network infrastructure, such as a RAN node (for example a base station, a NodeB, an evolved Node B (eNodeB or eNB), a fifth generation new radio (5G NR) NodeB (sometimes referred to as a gNodeB or gNB), a centralised unit (CU), or a distributed unit (DU)), a home subscriber server (HSS), a gateway (GW) such as a packet gateway (PGW), a serving gateway (SGW), a user plane gateway (UPGW) or various other nodes or functions within a Public Land Mobility Network (PLMN). In other embodiments, the ED 52 may be device that connects to the network infrastructure over a radio interface, such as a mobile phone, smart phone or other such device that may be classified as a User Equipment (UE). In some embodiments, the ED 52 may be a Machine Type Communications (MTC) device (also referred to as a machine-to-machine (m2m) device), or another such device that may be categorized as a UE despite not providing a direct service to a user. In some references, an ED 52 may also be referred to as a mobile device, a term intended to reflect devices that connect to a mobile network, regardless of whether the device itself is designed for, or capable of, mobility. In some references, an ED 52 may also be referred to as a wireless device (WD), a term intended to reflect devices that connect to a network via a radio link. Specific devices may utilize all of the components shown or only a subset of the components, and levels of integration may vary from device to device. Furthermore, a device may contain multiple instances of a component, such as multiple processors, memories, transmitters, receivers, etc. The ED 52 typically includes a processor 54, such as a Central Processing Unit (CPU) and may further include specialized processors such as a Graphics Processing Unit (GPU) or other such processor, a memory 56, a network interface 58 and a bus 60 to connect the components of ED 52. ED 52 may optionally also include components such as a mass storage device 62, a video adapter 64, and an I/O interface 68 (shown in dashed outline).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The ED 52 may also include one or more network interfaces 58, which may include at least one of wired network interface and a wireless network interface. As illustrated in FIG. 1, a network interface 58 may include a wired network interface to connect to a network 74, and also may include a radio access network interface 72 for connecting to other devices over a radio link. When ED 52 is a network infrastructure element, the radio access network interface 72 may be omitted for nodes or functions acting as elements of the public land mobile network (PLMN) other than those at the radio edge (e.g. a DU). When ED 52 is infrastructure at the radio edge of a network 74, both wired and wireless network interfaces may be included. When ED 52 is a wirelessly connected device, such as a UE, radio access network interface 72 may be present and it may be supplemented by other wireless interfaces such as WiFi network interfaces. The network interfaces 58 allow the ED 52 to communicate with remote entities such as those connected to network 74.

The mass storage 62 may comprise any type of non-transitory storage device configured to store data, programs and other information and to make the data, programs and other information accessible via the bus 60. The mass storage 62 may comprise, for example, one or more of a solid state drive, hard disk drive, a magnetic disk drive or an optical disk drive. In some embodiments, mass storage 62 may be remote to ED 52 and accessible through use of a network interface such as interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed outline) provide interface to couple the ED 52 to external input and output devices. Examples of input and output devices include a display 66 coupled to the video adapter 64 and an I/O device 70 such as a touch-screen coupled to the I/O interface 68. Other devices may be coupled to the ED 52, and additional or fewer interfaces may be utilized. For example, a serial interface such as a Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

In some embodiments, ED 52 may be a stand-alone device, while in other embodiments ED 52 may be resident within a data center. A data center, as will be understood in the art, is a collection of computing resources (typically in the form of services) that can be used as a collective computing and storage resource. Within a data center, a plurality of services can be connected together to provide a computing resource pool upon which virtualized entities can be instantiated.

Figure 2:
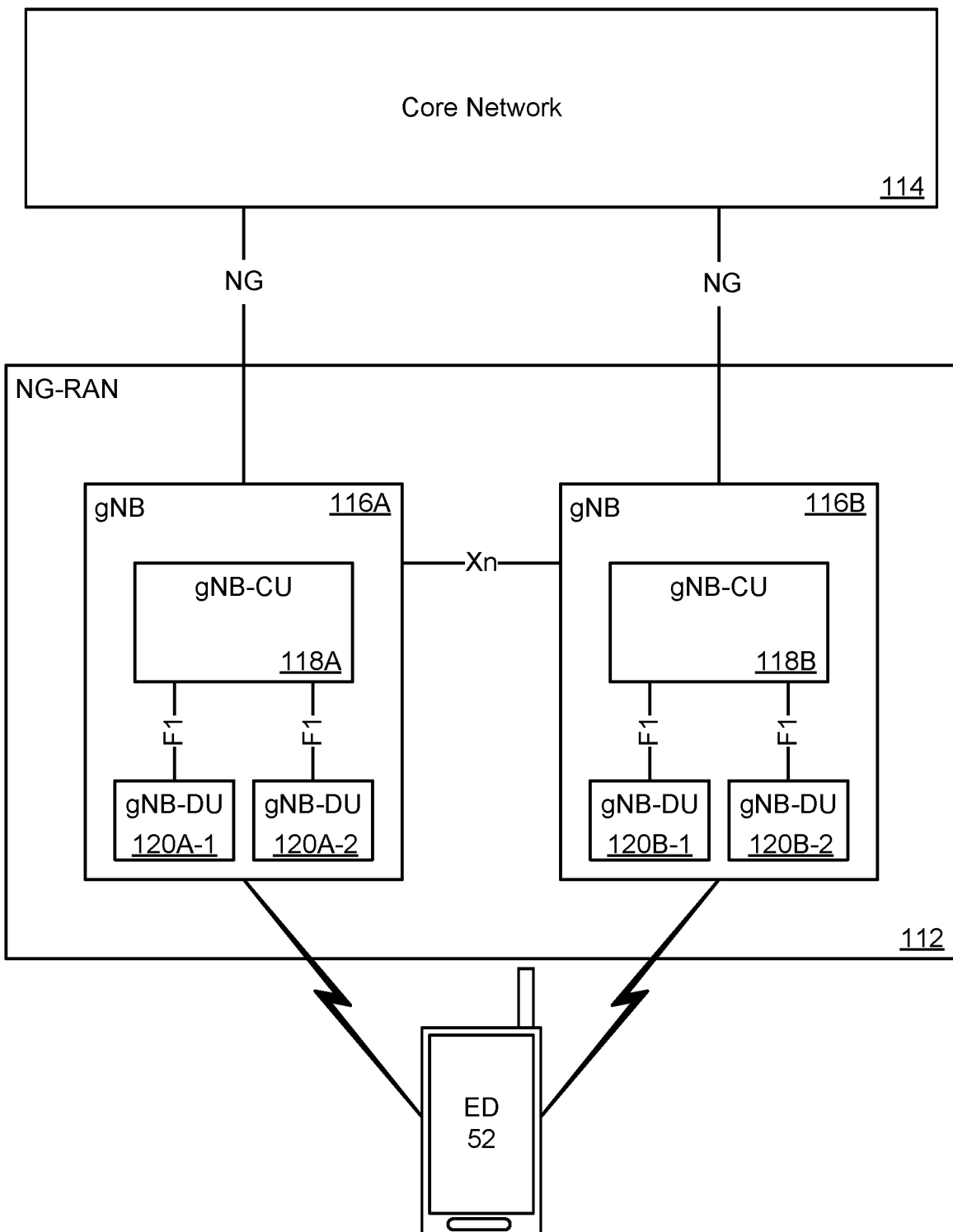
FIG. 2 is a block diagram illustrating an architecture of a 5G Radio Access Network.

FIG. 2 illustrates the architecture 110 for the implementation of a Next Generation Radio Access Network (NG-RAN) 112, also referred to as a 5G RAN. NG-RAN 112 is the radio access network that connects an ED 52 to a core network (CN) 114. Those skilled in the art will appreciate that CN 114 may be the 5GCN. In other embodiments, the CN 114 may be a 4G Evolved Packet Core (EPC) network. Nodes with NG-RAN 112 connect to the CN 114 over an NG interface. This NG interface can comprise both the NG-C interface to a CN control plane function (CPF) and an NG-U interface to a CN user plane function (UPF). NG-RAN 112 includes a plurality of radio access network (RAN) nodes that can be referred to as a gNB. In the NG-RAN 112, gNB 116A and gNB 116B are able to communicate with each other over an Xn interface. Within a single gNB 116A, the functionality of the gNB may be decomposed into a Centralized Unit (gNB-CU) 118A and a set of distributed units (gNB-DU 120A-1 and gNB-DU 120A-2, collectively referred to as 120A). gNB-CU 118A is connected to a gNB-DU 120A over an F1 interface. Similarly gNB 116B has a gNB-CU 118B connecting to a set of distributed units gNB-DU 120B-1 and gNB-DU 120B-2, collectively referred to as 120B). Each gNB DU may be responsible for one or more cells providing radio coverage within the PLMN. In other examples, an NG RAN node may be referred to as an ng-eNB where an ng-eNB-CU is connected to an ng-eNB-DU over a V1 interface.

It should also be understood that any or all of the functions discussed above with respect to the NG-RAN 112 may be virtualized within, for example, the resource pool of a network data center.

Disaggregated RAN Nodes

Figure 3:
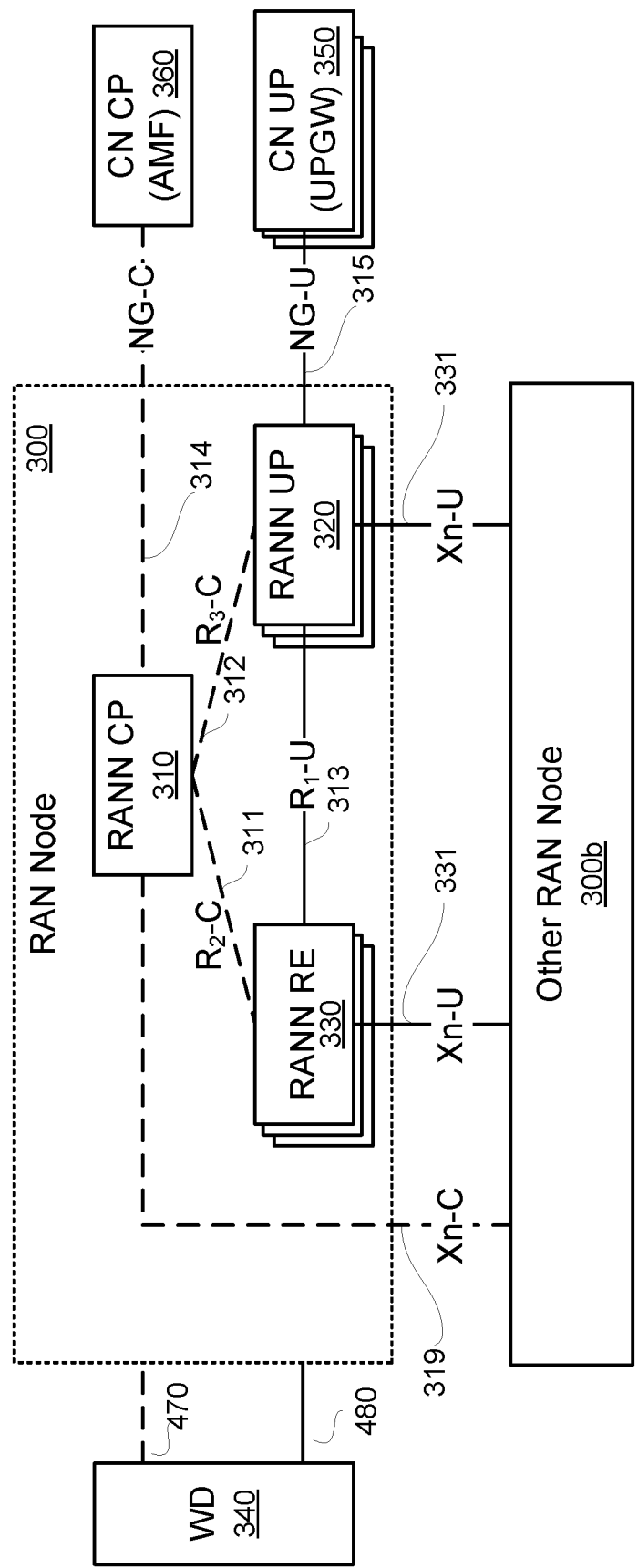
FIG. 3 is a block diagram showing an example model of a disaggregated RAN node.

Turning now to FIG. 3, there is shown a block diagram showing an example model of a RAN node, shown generally at 300, that is disaggregated in that its network elements may be physically dispersed to different locations within a PLMN (not shown).

In the present disclosure, the terminology used to describe the disaggregated RAN node 300 may differ from the terminology used in 3GPP standards. Those having ordinary skill in the relevant art will appreciate that in 3GPP, the model shown in FIG. 3 is described in several standards, but with different nomenclature used in new 5G radio (NR) and in long term evolution (LTE), and with different nomenclature used in CU-DU architectures and/or in dual connectivity architectures. It will be appreciated that such different nomenclature may be used interchangeably without departing from the present disclosure.

The network elements in the disaggregated RAN node 300 may comprise a RAN node control plane (CP) component 310 (hereinafter referred to as RAN node CP 310), one or more RAN node user plane (UP) components 320 (hereinafter referred to generally as RAN node UP 320 and collectively as RAN node UPs 320) and one or more RAN node radio edge (RE) components 330 (hereinafter referred to generally as RAN node RE 330 and collectively as RAN node REs 320). In example embodiments of the present disclosure, at least the network elements comprising the RAN node CP 310 and the RAN node UP 320 are at separate network locations.

The RAN node CP 310 provides protocol data unit (PDU) session management for a particular WD 340 and configures RAN radio resources for WDs 340 served by RAN node RE 330 within the scope of a RAN node 300. In some examples, the RAN node CP 310 may be further decomposed into a RAN node session management function (RSM) (not shown) and/or a RAN node resource management function (RMF) (not shown).

The RAN node UP 320 performs traffic steering between a RAN node RE 330 and one or more CN UPGWs 350 for a particular WD PDU session.

The RAN node RE 330 performs transmission and/or reception of signals over a radio link related to both CP and UP traffic between a WD 340 and the RAN node 300.

In some RAN nodes 300, RAN node CP 310 and RAN node UPs 320 may be co-located in a RAN node CU, such as RAN node CU 118A of gNB 116A shown FIG. 2, and RAN node RE 330 may be located in a RAN node DU, such as RAN node DU 120A-1 or 120A-2 of gNB 116A shown FIG. 2.

In some dual-connectivity examples, the RAN node CP 310 may be located in a master RAN node (not shown) and the RAN node UP 320 may be located in a secondary RAN node (not shown).

The interaction between entities of the disaggregated RAN node 300 may be defined through various interface reference points.

By way of non-limiting example, R1-U 313 may define a UP interface between a RAN node RE 330 and a RAN node UP 320. In some examples, this may be known as a F1-U interface. In some examples, this may be known as a V1-U interface. In some dual-connectivity examples, this may be known as an Xn-U and/or X2-U interface.

By way of non-limiting example, R2-C 311 may define a CP interface between a RAN node RE 330 and a RAN node CP 310. In some examples, this may be known as a F1-C interface. In some examples, this may be known as a V1-C interface.

By way of non-limiting example, R3-C 312 may define a CP interface between a RAN node CP 310 and a RAN node UP 320. In some examples, this may be known as an E1 interface. In some dual-connectivity examples, this may be known as an Xn-C and/or X2-C interface.

By way of non-limiting example, NG-C 314 may define a CP interface to a CN CPF 360 such as an Access and Mobility Management Function (AMF). In some examples, the NG-C interface 314 may be handled by the RAN node CP 310.

By way of non-limiting example, NG-U 315 may define a UP interface to a CN UPF 350 such as a UP gateway (UPGW). In some examples, the NG-U interface 315 may be handled by the RAN node UP 320.

By way of non-limiting example, Xn-C 319 may define a CP interface to a neighbouring RAN node 300b. In some examples the Xn-C interface 319 may be handled by the RAN node CP 310.

By way of non-limiting examples, Xn-U 331 may define a UP interface to a neighbouring RAN node 300b. In some examples, the Xn-U interface 331 may be handled by the RAN node RE 330. In some examples, the Xn-U interface 331 may be handled by the RAN node UP 320.

Figure 4:
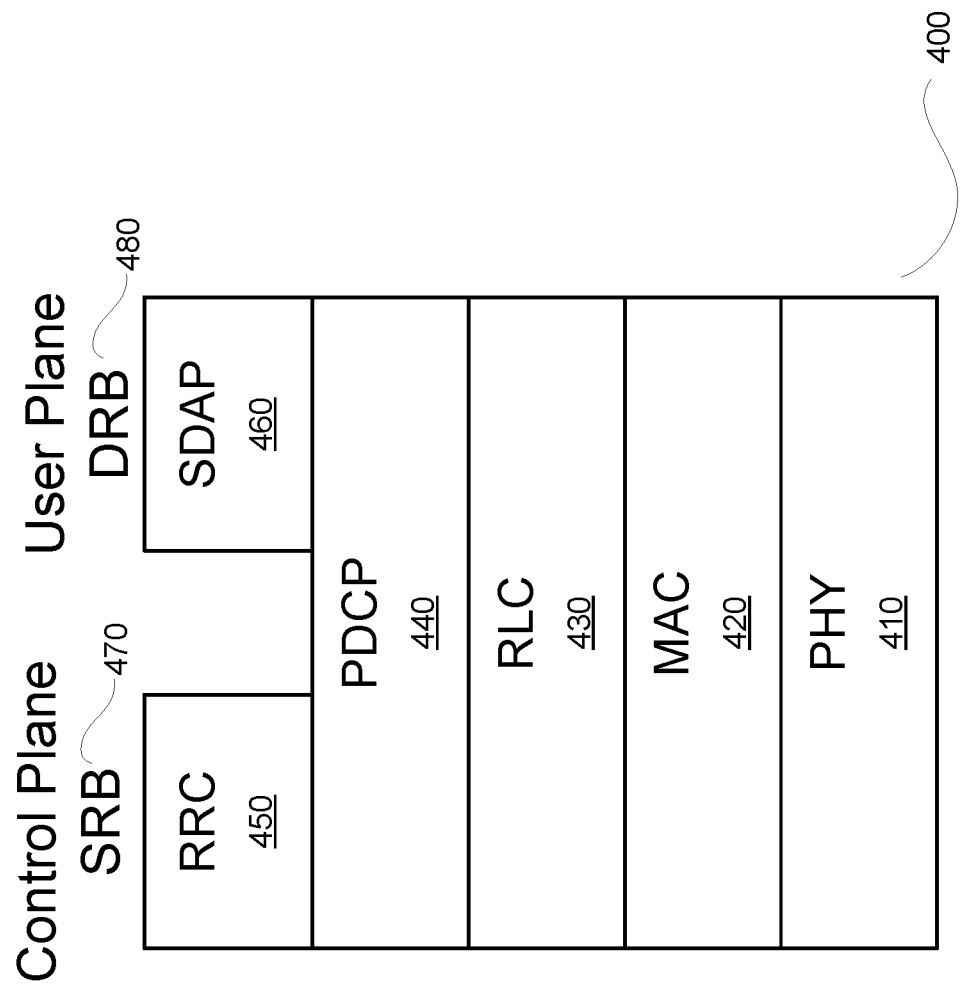
FIG. 4 is a diagram of an example radio link protocol stack.

Turning now to FIG. 4, there is shown an example diagram of a radio link protocol stack, shown generally at 400. The Uu interface between a WD 340 and a RAN node 300 may comprise several entities within the radio link protocol stack 400, namely, a physical (PHY) layer 410, a medium access control (MAC) layer 420, a radio link control (RLC) layer 430, a packet data convergence protocol (PDCP) layer 440, a radio resource control (RRC) layer 450 and a service data adaptation protocol (SDAP) layer 460.

CP information such as radio resource control (RRC) and non-access stratum (NAS) signalling may be carried over a signalling radio bearer (SRB) 470 while UP data may be carried over a data radio bearer (DRB) 480.

Figure 5:
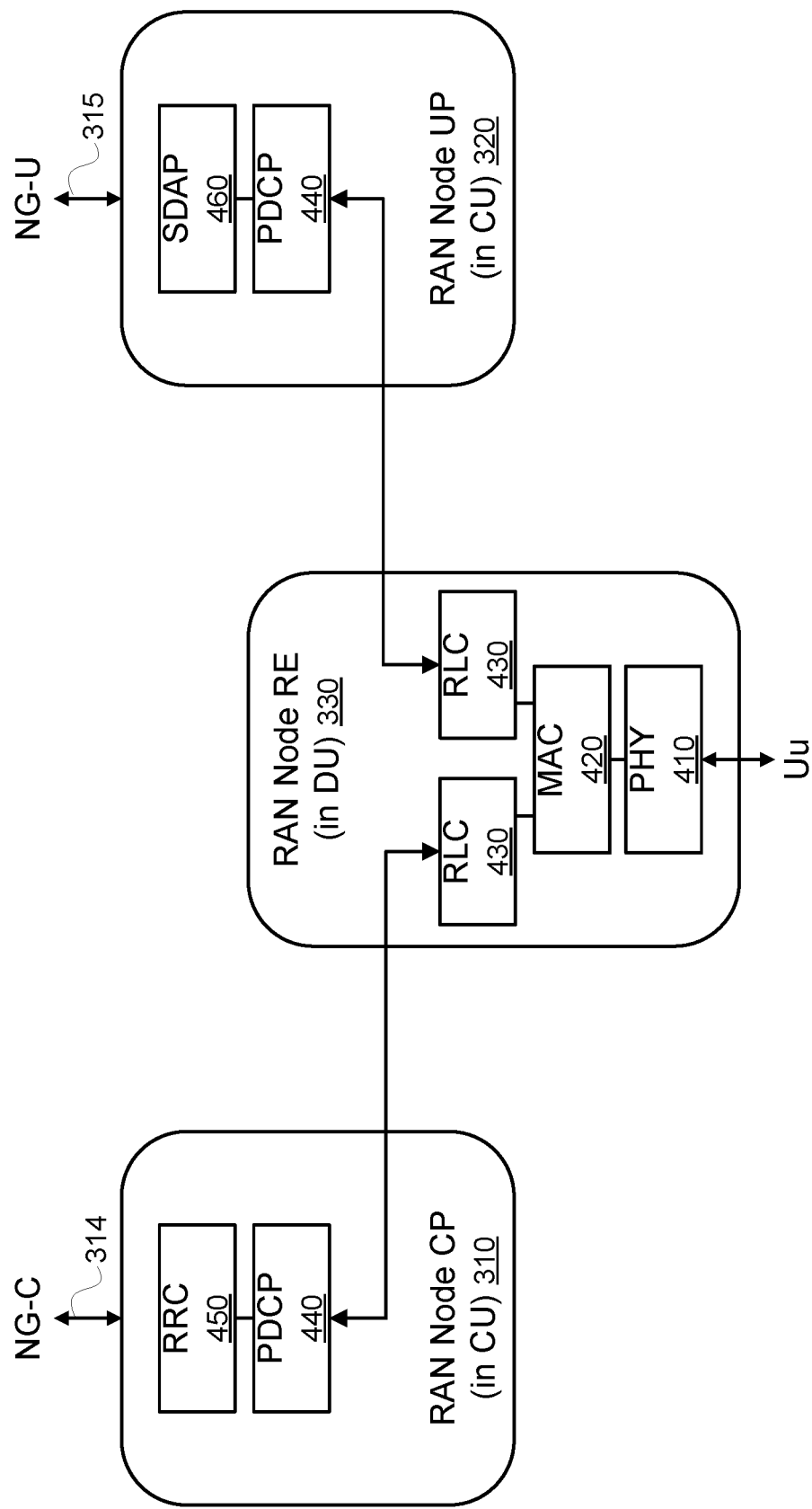
FIG. 5 is a block diagram showing an example configuration of the protocol stack of FIG. 4 within the disaggregated RAN node of FIG. 3.

In the disaggregated RAN node 300 of FIG. 3, in the UP, the protocol stack 400 on the network side may be split between the RAN node RE 330 and the RAN node UP 320, such as is shown in the example block diagram of FIG. 5. The RAN node UP 320 houses the upper layer protocol stack entities (including SDAP 460 and PDCP 440), while the RAN node RE 330 houses the lower layer protocol stack entities (RLC 430, MAC 420 and PHY 410). Similarly, in the CP, the RAN node CP 310 houses the upper layer protocol stack entities (including RRC 450 and PDCP 440), while the RAN node RE 330 houses the lower layer protocol stack entities (RLC 430, MAC 420 and PHY 410).

Figure 6:
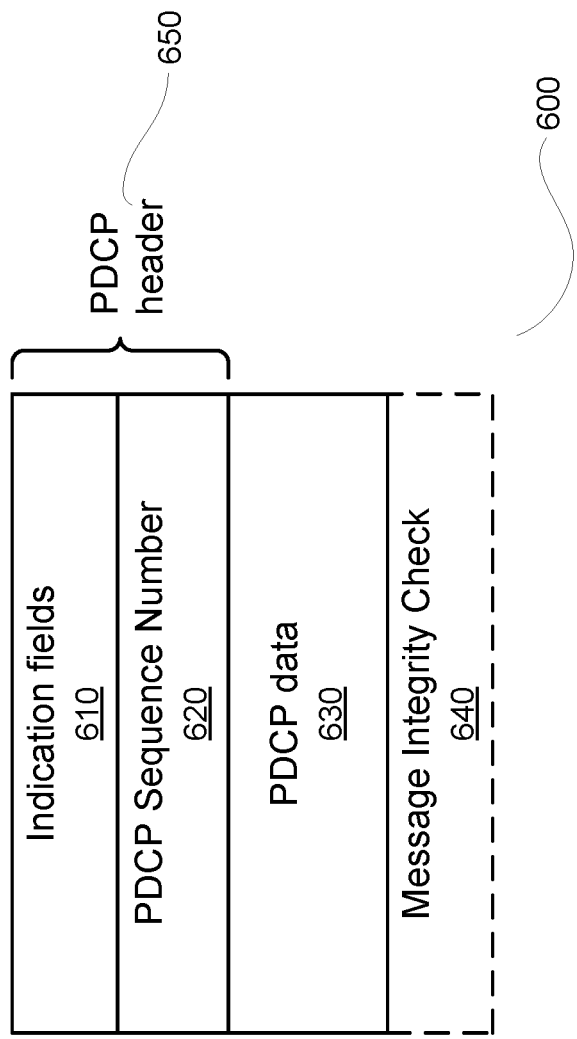
FIG. 6 is an example data PDU used by the PDCP.

Turning now to FIG. 6, there is shown an example data PDU shown generally at 600 used by the PDCP 440 (referred to hereinafter a PDCP data PDU 600). The PDCP data PDU 600 may comprise one or more indication fields 610, a PDCP sequence number 620 and a PDCP data field 630. In some examples, the PDCP data PDU 600 may comprise a message integrity check (MIC) field 640, also known as a message authentication code for integrity (MAC-I).

The indication field(s) 610 may be used, without limitation, to identify the type of PDCP data PDU 600, to signal in-band control information and/or to indicate the presence of optional fields within the PDCP data PDU 600.

The sequence number 620 may, without limitation, identify a given PDCP data PDU 600 within a series of one or more PDCP data PDUs 600. In some examples, the sequence number 620 may be used to ensure in-order deliver of PDCP data PDUs 600 to upper layers of the protocol stack 450, 460. In some examples, the sequence number 620 may be used as input to cryptographic operations such as encryption and integrity protection.

The indication field(s) 610 and the sequence number 620 may comprise a PDCP header 650.

The PDCP data field 630 may, without limitation, contain information that is to be delivered to upper layers of the protocol stack 450, 460. In some examples, if encryption is enabled for a DRB 480 or a SRB 470, the PDCP data field 630 may comprise the encrypted upper layer data.

The optional MIC field 640 may, without limitation, contain an integrity check computed over the PDCP header 650 and the PDCP data field 630 before encryption (if any). The MIC field 640 is only present if integrity protection has been enabled for a DRB 480 or an SRB 470.

Derivation of RAN Cryptographic Keys

Figure 8:
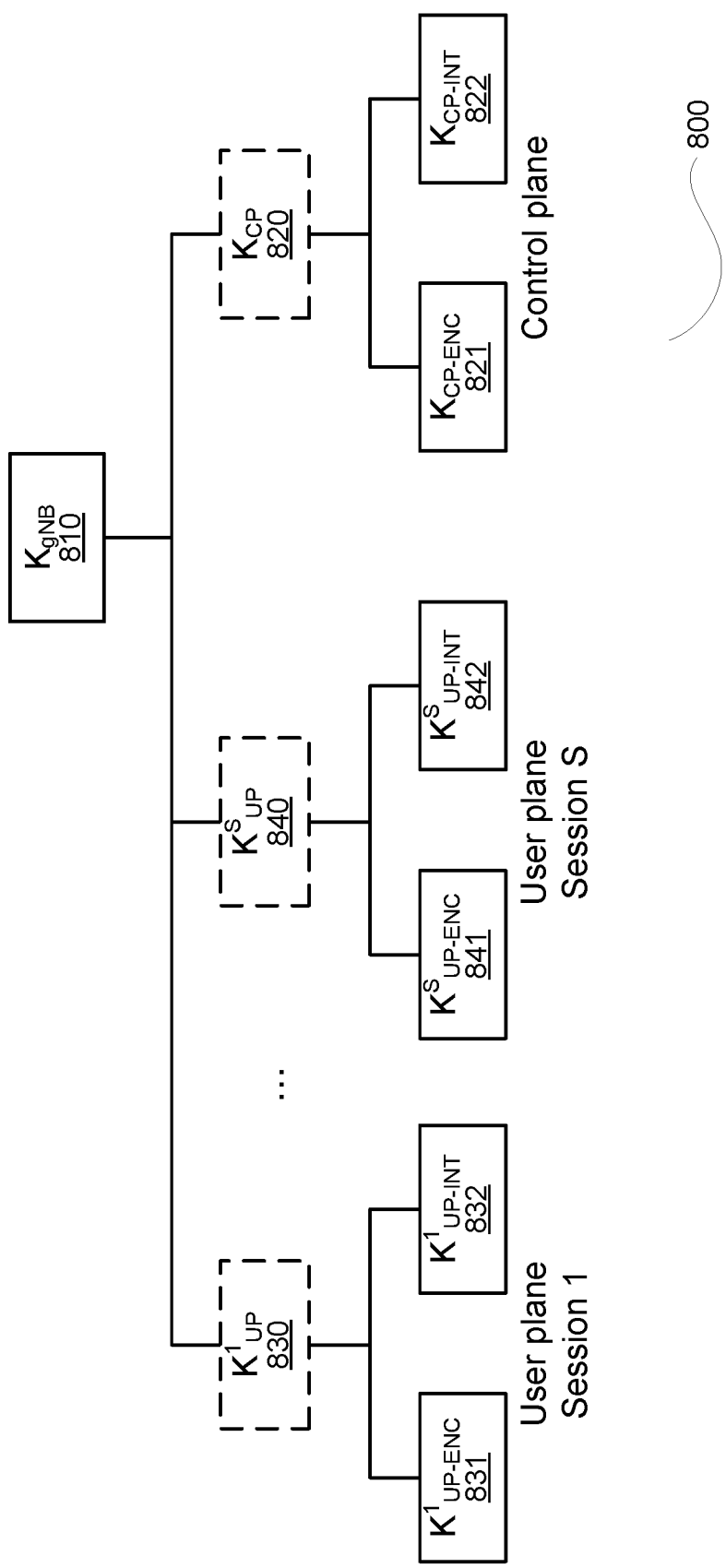
FIG. 8 is a block diagram showing an example cryptographic key hierarchy.

The cryptographic keys used by a RAN node, such as a gNB, for encryption and integrity protection are derived from a RAN temporal master key KgNB 800 (FIG. 8). A new RAN temporal master key KgNB* is independently derived by the WD 340 and by its current serving RAN node 300 on every inter-cell and intra-cell handover. No keys are ever transmitted over the radio link between a WD 340 and the RAN node 300. Separate temporal keys are then derived from the master key for encryption and integrity protection of CP traffic and UP traffic.

Figure 7:
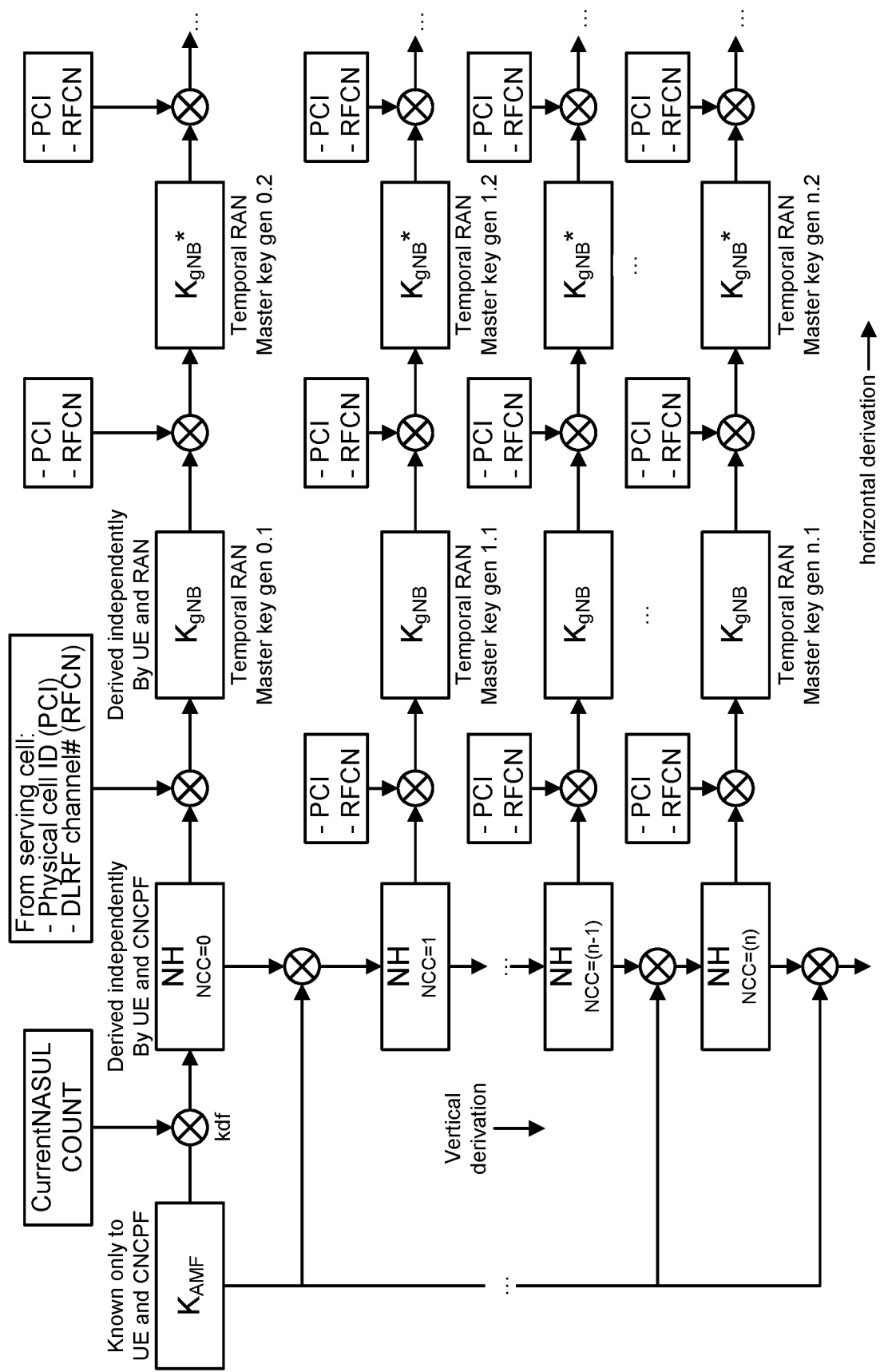
FIG. 7 is a block diagram showing an example procedure for deriving a RAN temporal master key.

A new RAN temporal master key may be derived using either of a horizontal key chain or a vertical key chain. A new generation of the key is based on a previous generation of the key. A stylised version of this derivation procedure is shown in FIG. 7.

For horizontal key derivation, a new RAN temporal master key (KgNB*) is derived through a key derivation function (KDF) that, by way of non-limiting example, accepts as inputs, the current RAN temporal master key (KgNB) 800, the physical cell identifier (PCI) of the serving cell and the radio frequency channel number (RFCN) used on the DL of the serving cell. KgNB* then becomes KgNB for subsequent operations.

For vertical key derivation, a new RAN temporal master key (KgNB) 800 is derived through a KDF that, by way of non-limiting example, accepts as inputs, a next hop (NH) key, the PCI of the service cell and the RFCN used on the DL of the serving cell.

The NH key used for vertical key derivation is computed independently by the WD 340 and the CN CPF 360. A new NH key (NH*) is derived through a KDF that, by way of non-limiting example, accepts as inputs, the current NH key (NH) and the WD master key ($K_{AMF}$). NH* then becomes the current NH key (NH) for subsequent operations.

When the CN decides to generate a new NH key, such as, by way of non-limiting example, following a handover to a new serving RAN node 300, the CN increments an NH chaining counter (NCC) and provides the NCC and the new NH key to the current serving RAN node 300 using a secure NG-C connection (by way of non-limiting example, secured using IPsec). The NCC acts as a key identifier to synchronise cryptographic operations between the WD 340 and the RAN node 300.

On a subsequent handover, the current serving RAN node 300 provides the value of NCC to the WD 340 (by way of non-limiting example, in a handover command). If the received NCC value is different from the value currently stored in the WD 340, the WD 340 generates a new NH key and increments its stored value of NCC. This procedure is repeated until the stored value of NCC matches the value received from the serving RAN node 300. Once the NCC values match, the resulting NH key is used to generate a new RAN temporal master key KgNB and, from that master key, to generate temporal keys for cryptographic operations in the new serving cell.

A similar security key hierarchy is defined for use between a WD and an ng-eNB where a RAN master session key KeNB is derived for use between the WD and the ng-eNB and RRC and UP cryptographic keys are derived from KeNB. In the present disclosure, references to "KgNB" are also applicable to KeNB and to any intermediate key such as Kng-ran* used during handover between NG RAN nodes.

RAN temporal traffic keys are derived from the RAN temporal master key and are used for encryption and integrity protection of CP traffic and UP traffic. A different temporal traffic key is used for each cryptographic procedure, non-limiting examples of which include, a CP encryption key (such as Kcp-enc or Krrc-enc) that is used for privacy protection of RRC messages, a CP integration protection key (such as Kcp-int or Krrc-int) that is used for integrity protection of RRC messages, a UP encryption key (such as Kup-enc) that is used for privacy protection of UP data and/or a UP integrity protection key (such as Kup-int) that is used for integrity protection of UP data.

Each of the temporal traffic keys is generated using a KDF that, by way of non-limiting example, accepts as inputs, the temporal master key (KgNB) 800, a pre-defined constant value that identifies the temporal traffic key being generated (such as, without limitation, a CP encryption key) and a pre-defined constant value that identifies the cryptographic algorithm (such as, without limitation, AES), selected by the RAN node 300 that is to be used for encryption and/or integrity protection.

Typically, encryption and/or integrity protection is always enabled for CP signalling via SRB 470. By way of contrast, encryption and/or integrity protection for UP data may be individually enabled by the CN for each PDU session. The RAN node 300 then uses such information to individually enable encryption and/or integrity protection through RRC configuration for each DRB 480 associated with the PDU session.

Within a given DRB 480 and/or SRB 470, each PDCP data PDU 600 is assigned a unique number, designated the COUNT value, for use in encryption and/or integrity protection operations. To prevent cryptographic attacks, a value of COUNT cannot be re-used with a given key. Thus, if the maximum number of distinct COUNT values has been exhausted, a new key is generated. Typically, the COUNT number space is on the order of 32 bits. This allows up to $2^{32}$ unique COUNT values. In some examples, a key change may be initiated much earlier to avoid problems with an undetected modulus 32 rollover of the COUNT from $(2^{32}-1)$ back to 0.

A WD 340 may establish multiple PDU sessions with the CN. Each PDU session will have its own set of DRBs 480. This ensures that traffic associated with one session does not adversely affect traffic associated with another session. Regardless of the number of PDU sessions established for a WD 340, there is only one instance of each CP SRB 470 associated with such WD 340.

If encryption and/or integrity protection is enabled for a DRB 480, the UP cryptographic keys, such as Kup-enc and/or Kup-int, used to protect data transmitted between the WD 340 and the RAN node 300, are distinct from the CP cryptographic keys, such as Kcp-enc and/or Kcp-int, used to protect signalling between the WD 340 and the RAN node 300.

If a WD 340 has multiple active PDU sessions, the set of UP keys used for one PDU session may be distinct from the set of UP keys used for another PDU session. However, all of the DRBs 480 associated with a given PDU session may use the same set of UP keys.

In a disaggregated RAN node 300, a RAN node CP 310 is responsible for generating UP keys and for communicating the UP keys to the appropriate RAN node UP 320. The RAN node CP 310 may not provide the RAN node UP(s) 320 with the temporal master key, such as NH and/or KgNB, used to generate the UP keys since this would violate the security of other cryptographic keys derived from the temporal master key.

Turning now to the example cryptographic key hierarchy shown generally at 800 in FIG. 8, it may be seen that the cryptographic keys derived for use in the CP are different from the cryptographic keys used in the UP. This is similar to the conventional situation in RAN.

In some examples, an intermediate cryptographic key ($K_{CP}$) 820 may be derived from the temporal master key (KgNB) 810 for use in the CP. In such examples, the temporal traffic keys for CP encryption (Kcp-enc) 821 and/or for CP integrity protection (Kcp-int) 822 may then be derived from the intermediate cryptographic key ($K_{CP}$) 820.

In some examples, there is no intermediate cryptographic key ($K_{CP}$) 820. Rather, the temporal traffic keys for CP encryption (Kcp-enc) 821 and/or for CP integrity protection (Kcp-int) 822 are derived directly from the temporal master key (KgNB) 810.

Conventionally, only one set of cryptographic keys is derived for use in the UP. However, in some examples, multiple sets of UP cryptographic keys may be derived for use in the UP. In one example, as illustrated in FIG. 8, a different set of UP cryptographic keys may be derived for each PDU session. Such keys are denoted herein by the superscript n, where n is a PDU session identifier. Thus, the temporal traffic keys for UP encryption and integrity protection for UP PDU session 1 may be denoted as $K^1$up-enc 831 and $K^1$ up-int 832 respectively and the temporal traffic keys for UP encryption and integrity protection for UP PDU session S may be denoted as $K^S$up-enc 841 and $K^S$up-int 842 respectively.

When different PDU sessions are associated with different RAN node UPs 320, this allows different sets of UP keys to be associated with different RAN node UPs 320, which in turn, provides independence of security domains and protection of UP traffic passing through different RAN node UPs 320. It also allows RAN node UPs 320 for different PDU sessions to be instantiated in different locations. Further, this allows different cryptographic algorithms to be employed for different PDU sessions. Thus, it is conceivable to disable encryption for some PDU sessions (by way of non-limiting example, for local break-out of internet traffic) but not for others. In addition, and/or in the alternative, a stronger cryptographic algorithm that may consume an increased amount of battery power in the WD 340, may be enabled only for sensitive PDU sessions (by way of non-limiting example, for on-line banking), while a relatively weaker cryptographic algorithm that may consume a smaller amount of battery power in the WD 340, may be enabled for other, less sensitive PDU sessions (by way of non-limiting example, for web browsing).

In some examples, where UP keys are derived by the RAN node UP 320, such as is described in connection with FIG. 12, an intermediate cryptographic key ($K^S_{UP}$) 840 may be derived by the RAN node CP 310 from the temporal master key (KgNB) 810 for use with PDU session S in the UP. In such examples, the temporal traffic keys for UP encryption ($K^S$up-enc) 841 and/or UP for integrity protection ($K^S$up-int) 842 may then be derived by the RAN node UP 320 associated with the PDU session S from the intermediate key ($K^S_{UP}$) 840.

In some examples, where UP keys are derived by the RAN node CP 310, such as is described in connection with FIG. 10 and/or FIG. 11, there is no intermediate key ($K^S_{UP}$) 840. Rather, the temporal traffic keys for UP encryption ($K^S$up-enc) 841 and/or for integrity protection ($K^S$up-int) 841 associated with the PDU session S are derived directly by the RAN node CP 310 from the temporal master key (KgNB) 810.

In some examples, UP keys may be derived using a generic KDF that accepts as inputs, a string S constructed from n+1 input parameters in accordance with:

$$S=FC\|P0\|L0\|P1\|L1\|P2\|L2\|P3\|L3\| \ldots \|Pn\|Ln \quad (1)$$

where "∥" is a string concatenation operation and, when deriving keys for UP encryption and/or integrity protection from the temporal master key (KgNB) or from an intermediate key ($K^S_{UP}$):

FC is a single octet used to distinguish between different instances of the encryption algorithm;

P0 is an algorithm type distinguisher (such as, without limitation, AES);

L0 is the length of the algorithm type distinguisher P0;

P1 is an algorithm identity (such as, without limitation, UP encryption and/or UP integrity check);

L1 is the length of the algorithm identity P1;

P2 is a connection identity provided by the RAN node CP 310 to the WD 340 that indicates the connection where the UP key will be applied. By way of non-limiting example, if different UP keys are derived for different PDU sessions, this may be a PDU session identifier. By way of non-limiting example, if different UP keys are derived for different DRBs, this may be a DRB identifier. By way of non-limiting example, if different UP keys are derived for different QoS flows, this may be a QoS flow identifier (QFI). By way of non-limiting example, this may be a connection sequence number;

L2 is the length of the connection identity P2;

P3 is a key set sequence number that is a monotonically increasing number that allows multiple sets of UP keys to be derived from a single instance of the temporal master key (KgNB) and/or intermediate key ($K^S_{UP}$); and L3 is the length of the key set sequence number P3.

In some examples, a key set identifier (KSI) is used to identify a particular set of UP encryption (Kup-enc) and/or integrity protection (Kup-int) keys from among a plurality of potential sets of UP keys. In some examples, if different keys are associated with different PDU sessions, the KSI will be unique at least within the context of a given PDU session. In some examples, if different keys are associated with different DRBs 480 within a PDU session, the KSI will be unique at least within the context of a given DRB 480.

In some examples, the key set identifier is a sequence number ksi in the range of 0≤ksi≤M, where M≥1 and accommodates a maximum number of key sets that may be active at any given time. In some examples, a new key set identifier (such as, without limitation, ksi*) may be derived by incrementing the current key set identifier (such as, without limitation, ksi) by some fixed value, by way of non-limiting example:

$$ksi^*=(ksi+1) \bmod M \quad (2)$$

In some examples, the key set identifier may be derived from the key set sequence number.

In some examples, the key set identifier is derived from the keys themselves and/or from the parameters used to derive the keys in the key set. By way of non-limiting example, the key set identifier for a UP key set (Kup-enc and/or Kup-int) that is derived from parameters ($p_1, p_2, \ldots p_n$), may be the output of a pseudo-random function (prf) that may incorporate other information ($r_1, r_2, \ldots r_m$) that is known to both the RAN node 300 and the WD 340. That is:

$$ksi=prf(Kup\text{-}enc, Kup\text{-}int, p_1, p_2, \ldots p_n, r_1, r_2, \ldots r_m) \quad (3)$$

The information ($r_1, r_2, \ldots r_m$) may comprise without limitation, an identifier of the PDU session, an identifier of the DRB 480, an identifier of the cryptographic algorithm, an identifier of the WD 340 and/or an identifier of the RAN node 300.

Typically, the identity of the UP key used to protect a PDCP data PDU 600 (such as, without limitation, a PDCP data PDU 600 containing the NCC) is communicated through an RRC CP message from the RAN node CP 310 to the WD 340. This is based on the assumption that only one set of UP keys is active at any given time and that the RAN node CP 310 and the RAN node UPs 320 are co-located.

By contrast, in the present disclosure, more than one set of UP keys may be active at any given time. Thus, in some examples, the identity of the UP key used to protect a given PDCP data PDU 600 may be communicated over a DRB along with the data PDU 600 itself. In some examples, this is reflected by modifying the PDCP header 650 from that shown in FIG. 6 to the modified PDCP header 950 of the PDCP data PDU shown generally at 900 in FIG. 9A, to introduce a key identifier (keyID) field 910 into the PDCP header 950.

Figure 9:
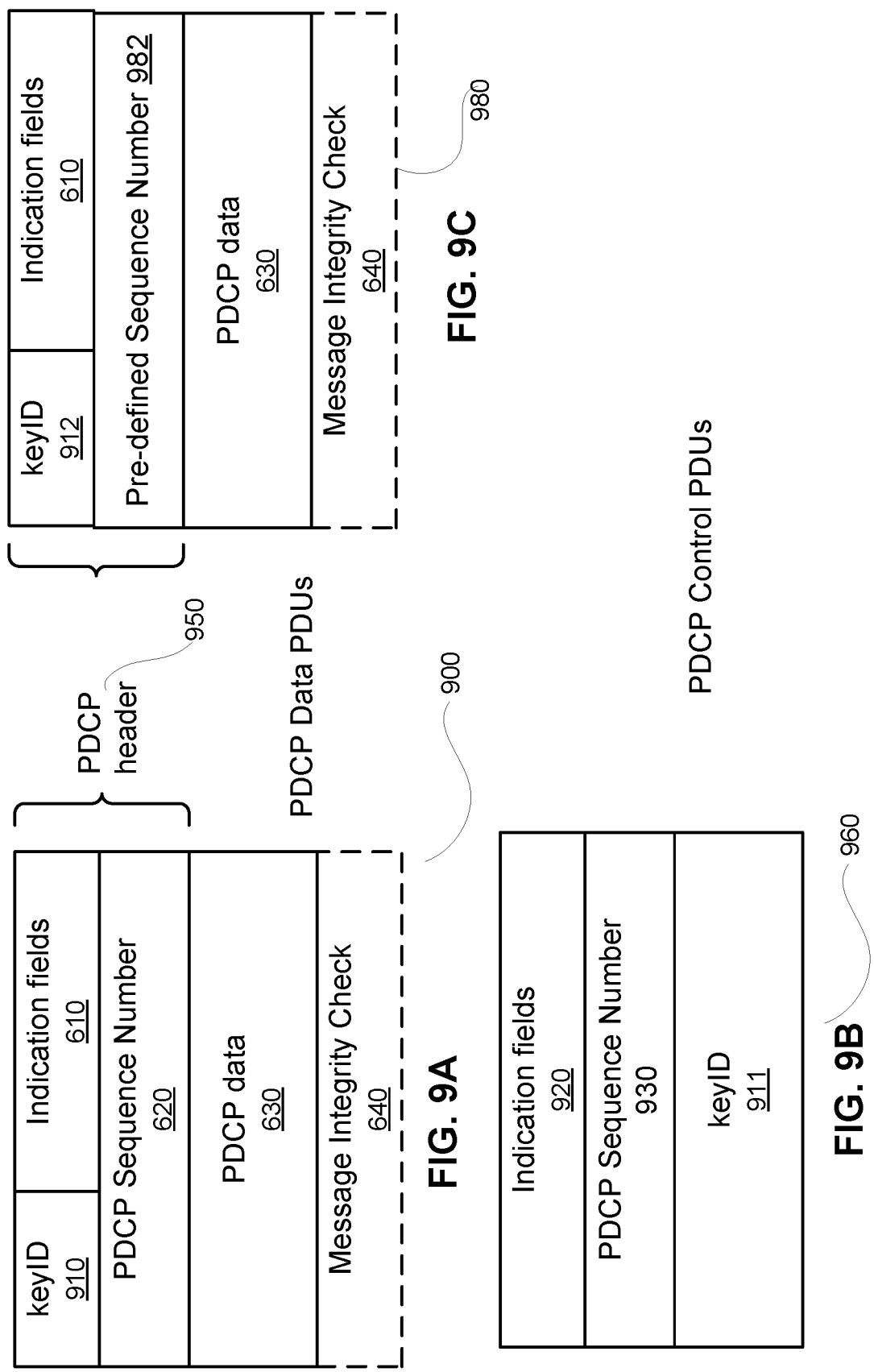
FIG. 9A is an example modified data PDU used by the PDCP according to an example.
FIG. 9B is an example end marker PDCP control PDU according to an example.
FIG. 9C is an example end marker PDCP data PDU according to an example.

The contents of the key identifier field 910 is based on the key set identifier (KSI) associated with the set of UP keys used to protect the particular data PDU 900. By way of non-limiting example:

$$keyID = \bmod(ksi, 2^N) \quad (5)$$

where N≥1 and is the size, in number of bits, of the key identifier field (keyID) in the modified PDCP data PDU header 950 of FIG. 9A.

In some examples, the key set identifier is a sequence number and the size (N) of the key identifier (keyID) field 910 is selected to accommodate a maximum number of key sets that may be activate at any given time. Typically, multiple key sets are usually only active during transition periods, so in some examples, N may be a small number, such as, without limitation, in the range of 1≤N≤3.

In some examples, the key set identifier is the output of a prf and the size of the key identifier (keyID) field 910 is selected to minimise the probability that two active KSIs will result in a common keyID 910. In such examples, N may be a large number, such as, without limitation 8.

In some examples, the key identifier (keyID) field 910 may be transmitted separately from the PDCP data PDUs 600. In such examples, the PCDP data PDU 600 is employed, not the modified PDCP data PDU 900 of FIG. 9A. Rather, an end marker PDCP control PDU 960 is employed, such as is shown in FIG. 9B. The end marker PDCP control PDU 960 has an indication field 920 that identifies it as an end marker PDCP control PDU 960, a PDCP sequence number 930 associated with and that follows the sequence number of the previous PDCP data PDUs 600 in the PDU stream that are cryptographically protected using the old key set, and the key ID 911 of the new UP key set. The end marker PDCP control PDU 960 is interposed within the stream of PDCP data PDUs 600. The PDCP data PDUs 600 with PDCP sequence numbers 620 that precede in sequence the end marker PDCP control PDU sequence number 930 are cryptographically protected with the old key set. The PDCP data PDUs 600 that include and follow in sequence the end marker PDCP control PDU sequence number 930 are cryptographically protected with the new key set as indicated by the key ID 911.

In some examples, the end marker is a PDCP data PDU 980, such as is shown in FIG. 9C, where the PDCP sequence number 982 is set to a predetermined value such as, by way of non-limiting example, setting all bits of the PDCP sequence number 982 to '1'. The PDCP data PDUs 600 that precede in sequence the end marker PDCP data PDU 980 as well as the end marker PDCP data PDU 980 are cryptographically protected with the old key set. The PDCP data PDUs 600 that follow in sequence the end marker PDCP data PDU 980 are cryptographically protected with the new key set as indicated by the key ID 912.

A number of examples of mechanisms for coordinating the use of cryptographic keys between a WD 340 and a RAN node 300, irrespective of whether the RAN node 300 is disaggregated and/or geographically dispersed, will now be disclosed.

In a first example mechanism, the RAN node CP 310 derives UP cryptographic keys used by a RAN node 300 and the RAN node CP 310 conveys UP keys to the RAN node UP 320 associated with the PDU session.

In some examples of this first example mechanism, the RAN node CP 310 provides the RAN node UP 320 with a single set of UP keys. In some examples, the RAN node UP 320 then informs the RAN node CP 310 when a new set of UP keys is to be employed. In some examples, the RAN node UP 320 provides information to the RAN node CP 310, whether periodically and/or on-demand, that allows the RAN node CP 310 to determine when a new set of UP keys is to be employed. However determined, when the RAN node CP 310 derives a new set of UP keys, it coordinates with the WD 340 and the RAN node UP 320 to transition from the old UP key set to the new UP key set.

Figure 10:
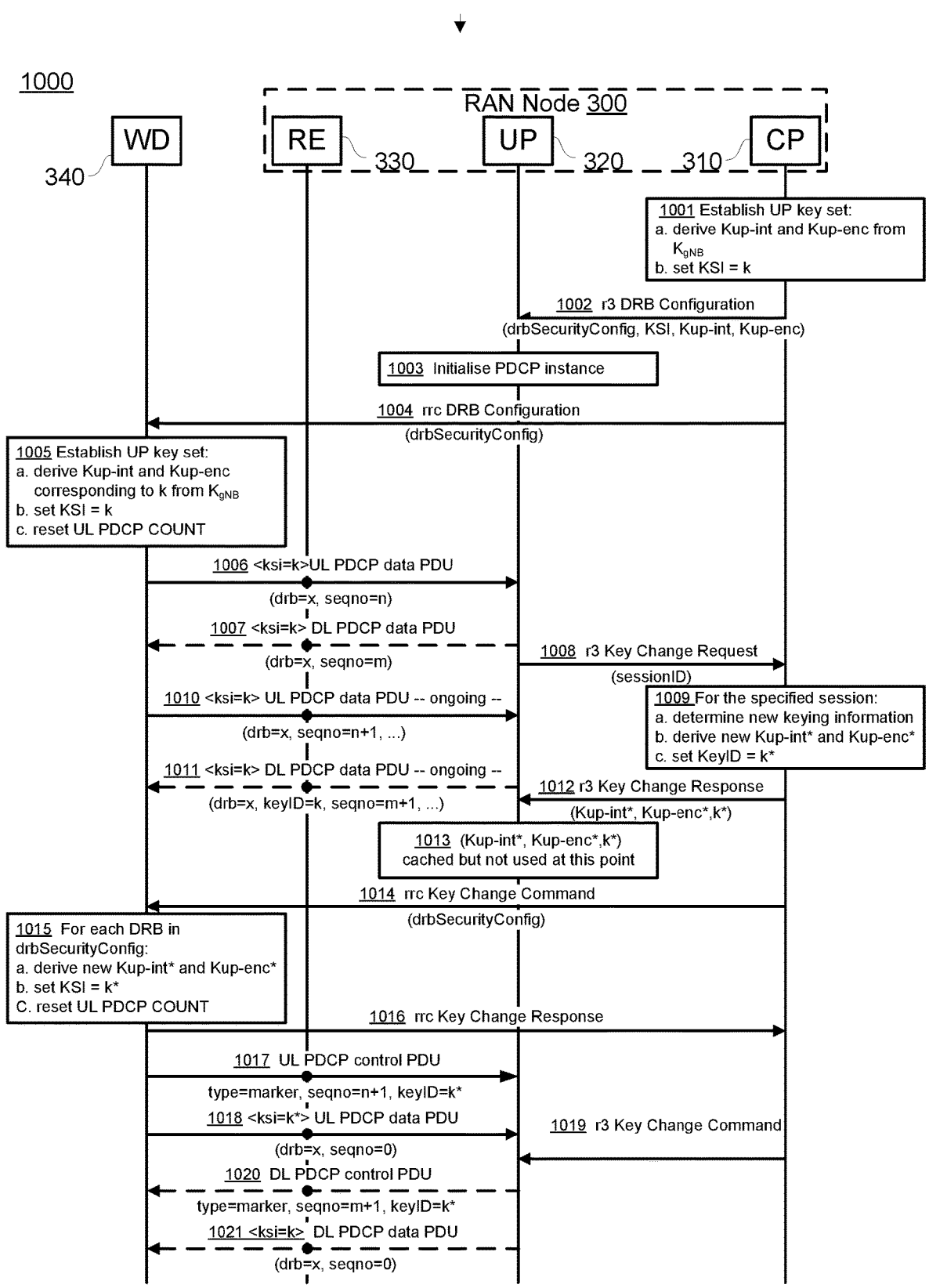
FIG. 10 is a signal flow diagram showing example signal flows by which a RAN node CP may derive a single set of UP cryptographic keys and conveys it to the RAN node UP associated with a given session according to an example.

The first example mechanism is described in the example signal flow diagram shown generally at 1000 in FIG. 10. The figure shows communications between a WD 340, a RAN node RE 330, a RAN node UP 320 and a RAN node CP 310.

When a PDU session is initially established 1001, the RAN node CP 310 uses the current temporal master key (KgNB) 810 to derive a set of UP keys (Kup-enc 841 and/or Kup-int 842) in accordance, for example, with a KDF using a string S, such as the string shown in equation (1), as well as a key set identifier (KSI) k corresponding thereto.

The RAN node CP 310 provides 1002 the DRB 480 security configuration to be applied to a given PDU session to the RAN node UP 320 associated with such session. The configuration may include, without limitation, the cryptographic algorithm selected by the RAN node CP 310, the derived set of UP keys (Kup-enc and/or Kup-int), the key set identifier k for the set of UP keys; a maximum period of time that the key set can be used; whether encryption is enabled for the DRB 480 and/or whether integrity protection is enabled for the DRB 480. In some examples, the cryptographic algorithm is selected by the RAN node CP 310 based on, without limitation, the capabilities of the WD 340, the capabilities of the RAN node UP 320; the PDU session security policies provided by the CN and/or local RAN node 300 security policies, which in some examples may have been configured by the mobile network operator (MNO).

The RAN node UP 320 uses the received configuration to initialize 1003 a PDCP instance and resets the DL COUNT value for the DRB 480 corresponding thereto.

The RAN node CP 310 provides 1004 the WD 340 with the DRB 480 security configuration to be applied to the DRB(s) 480 of the appropriate PDU session. In some examples, the configuration may include, without limitation, the cryptographic algorithm selected by the RAN node CP 310; the current value of NCC; a connection identity; the key set identifier k for the set of UP keys; a maximum period of time that the key set can be used; whether encryption is enabled for the DRB 480 and/or whether integrity protection is enabled for the DRB 480.

The WD 340 uses the received configuration and the temporal master key (KgNB) 810 indicated by the current value of NCC to derive 1005 a set of UP keys (Kup-enc and/or Kup-int) corresponding to the key set identifier k, initializes a PDCP instance and resets the UL COUNT value for the DRB 480 corresponding thereto.

Thereafter, there may be one or more UL 1006 and/or DL 1007 UP transmissions of PDCP data PDUs 600 on the affected DRB(s) 480 using the UP keys associated with the key set identifier k.

At some point in time, the RAN node UP 320 provides 1008 an indication to the RAN node CP 310 that a key change is appropriate. In some examples, without limitation, the key change is as a result of an event-driven key change request (such as is shown by non-limiting example in FIG. 10) based upon detection of a corresponding event (including, without limitation, exhaustion of the COUNT parameter and/or expiry of a lifetime timer for the key k) by the RAN node UP 320. In some examples, without limitation, the key change is as a result of information periodically provided by the RAN node UP 320 to the RAN node CP 310 (including, without limitation, a PDCP status report) and/or provided by the RAN node UP 320 in response to a request from the RAN node CP 310 (including, without limitation, a PDCP status request) that allows the RAN node CP 310 to make a key change determination.

However initiated, upon receipt 1008 of the indication, the RAN node CP 310 uses the current temporal master key (KgNB) 810 to derive 1009 a new set of UP keys (Kup-enc* and/or Kup-int*) and a key set identifier k* corresponding thereto for the PDU session.

In the meantime, there may continue to be one or more UL 1010 and/or DL 1011 UP transmissions of PDCP data PDUs 600 using the UP keys associated with the current key set identifier k.

The RAN node CP 310 provides 1012 an updated DRB 480 security configuration to be applied to the DRBs 480 of the appropriate PDU session to the RAN node UP 320 to initiate a change in the cryptographic keys associated with the current key set identifier k. In some examples, the configuration may include, without limitation, the cryptographic algorithm selected by the RAN node CP 310 (if changed), the newly-derived set of UP keys (Kup-enc* and/or Kup-int*), the key set identifier k* for the newly-derived set of UP keys; a maximum period of time that the newly-derived key set can be used; whether encryption is enabled for the DRB 480 and/or whether integrity protection is enabled for the DRB 480.

The RAN node UP 320 caches 1013 the newly-derived set of UP keys (Kup-enc* and/or Kup-int*) and the key set identifier k* corresponding thereto but does not use them at this point in time.

In one example, the RAN node UP 320 receives the second cryptographic key set from the RAN node CP 310, and the RAN node UP 320 and the WD 340 are responsive to coordination, by the RAN node CP 320, of the changeover to the second cryptographic key set. The RAN node CP 310 provides 1014 an updated DRB 480 security configuration to be applied to the DRBs 480 of the appropriate session to the WD 340 to initiate a change in the cryptographic keys associated with the current key set identifier k. In some examples, the configuration may include, without limitation, the cryptographic algorithm selected by the RAN node CP 310 (if changed), the current value of NCC, the key set identifier k* for the newly-derived set of UP keys; a maximum period of time that the newly-derived key set can be used; whether encryption is enabled for the DRB 480 and/or whether integrity protection is enabled for the DRB 480.

In some examples, the DRB 480 security configuration provided 1014 by the RAN node CP 310 may be considered to be (part of) an RRC cryptographic key change PDU. In other examples, the DRB 480 security configuration provided 1014 by the RAN node CP 310 may be considered to be (part of) an RRC reconfiguration PDU.

The WD 340 uses the received configuration and the temporal master key (KgNB) 810 indicated by the current value of NCC to derive 1015 a new set of UP keys (Kup-enc* and/or Kup-int*) corresponding to the key set identifier k*.

The WD 340 provides 1016 a positive acknowledgement in the form of a confirmatory PDU to the RAN node CP 310, indicating that the new set of UP keys corresponding to the key set identifier k* have been derived.

The WD 340 signals 1017 a change in the UL UP key set to the RAN node UP 320 by transmitting a key change indicator such as an end marker UL PDCP control PDU 960 or an end marker UL PDCP data PDU 980 that contains the key set identifier k* of the newly-derived UP key set. In some examples, the UL transmission 1017 may be considered to be a cryptographic key change PDU.

Generally, a cryptographic key change PDU includes a key change indicator, which may be carried as a particular value in a predetermined field or a combination of fields of the PDCP PDU. The key change indicator can include a key set identifier in a header field of the PDCP PDU. The key change indicator can include a threshold sequence number, which is interpreted as follows: PDCP data PDUs having a sequence number below the threshold are associated with a prior cryptographic key set (for encryption or decryption thereof), while PDCP data PDUs having sequence numbers at and above the threshold are associated with a new cryptographic key set. Such a threshold sequence number may be associated with an end marker, as described herein.

The WD 340 uses 1018 the newly-derived UP keys (Kup-enc* and/or Kup-int*) corresponding to the key set identifier k* to initialize a PDCP instance and resets the UL COUNT value for the DRB 480 corresponding thereto. Thereafter, all UL UP transmissions of PDCP data PDUs 600 on the affected DRB(s) 480 use the newly-derived UP keys associated with the key set identifier k*.

If the RAN node UP 320 receives a key change indicator such as an end marker UL PDCP control PDU 960 or an end marker UL PDCP data PDU 980, the RAN node UP 320 autonomously signals 1020 a change in the DL UP key set to the WD 340 by transmitting a key change indicator such as an end marker DL PDCP control PDU 960 or an end marker DL PDCP data PDU 980 that contains the key set identifier k* of the newly-derived UP key set. In some examples, the DL transmission 1020 may be considered to be a cryptographic key change PDU.

In some examples, the WD 340 may not have any UL data queued for transmission at the time of confirming a change in the UL UP key set 1016. As such, the RAN node CP 310 may instruct 1019 the RAN node UP 320 to change over to the newly-derived UP key set provided 1012 and subsequently cached 1013. In an embodiment, encoding and decoding subsequent to the change in cryptographic key set is performed by the RAN node UP 320 only upon receipt of a key change command from the RAN node CP 310 indicating that the change in cryptographic key sets has been completed.

If the RAN node UP 320 has not previously received 1017 a key change indicator, such as an end marker UL PDCP control PDU 960 or an end marker UL DPCP data PDU 980, the RAN node UP 320 signals a change to the newly-derived DL UP key set to the WD 340 by transmitting 1020 a key change indicator, such as an end marker DL PDCP control PDU 960 or an end maker DL PDCP data PDU 980, that contains the key set identifier k* of the newly-derived UP key set.

The RAN node UP 320 uses 1021 the newly-derived UP keys (Kup-enc* and/or Kup-int*) corresponding to the key set identifier k* to initialize a PDCP instance and resets the DL COUNT value for the DRB 480 corresponding thereto. Thereafter, all DL UP transmissions of PDCP data PDUs 600 on the affected DRB(s) 480 use the newly-derived UP keys associated with the key set identifier k*.

In a modification of the first example mechanism, the RAN node CP 310 provides the RAN node UP 320 with multiple sets of UP keys. When a new set of UP keys is to be employed, the RAN node UP 320 communicates directly with the WD 340, via in-band UP signalling, to coordinate the changeover from the old UP key set to the new UP key set. This reduces the amount of CP signalling involved. In some examples, if the RAN node UP 320 does not have an available unused UP key set, the RAN node UP 320 informs the RAN node CP 310 that new key sets should be provided. In this modification, the RAN node UP 320 may autonomously coordinate, with the WD 340, to change between key sets.

Figure 11:
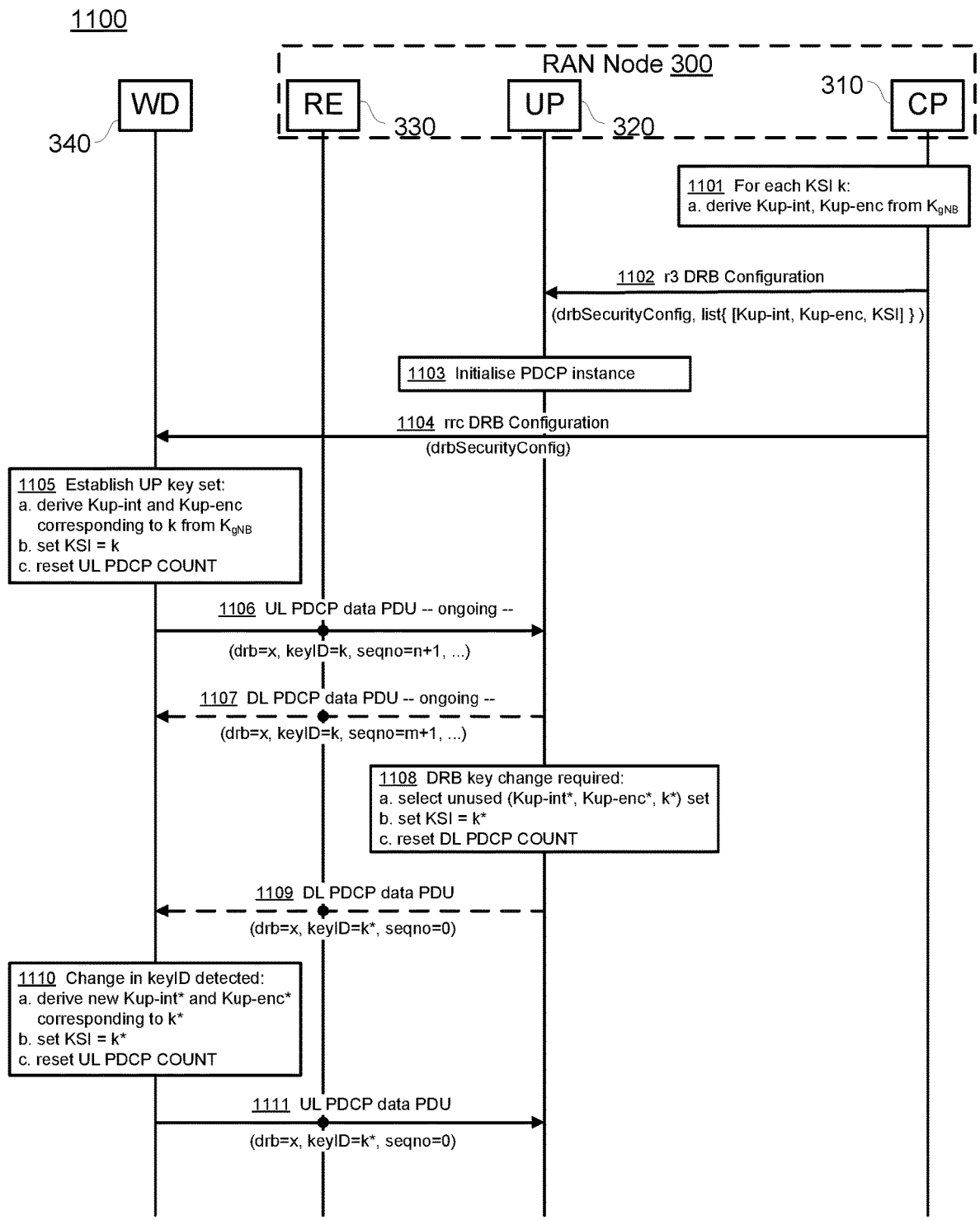
FIG. 11 is a signal flow diagram showing example signal flows by which a RAN node CP may derive multiple sets of UP cryptographic keys and conveys them to the RAN node UP associated with a given session according to an example.

The modified example of the first example mechanism is described in the example signal flow diagram shown generally at 1100 in FIG. 11. The figure shows communications between a WD 340, a RAN node RE 330, a RAN node UP 320 and a RAN node CP 310.

When a PDU session is initially established 1101, the RAN node CP 310 uses the current temporal master key (KgNB) 810 to derive a plurality L sets of UP keys ($K^L$up-enc and/or $K^L$up-int) in accordance, for example, with a KDF using a string S, such as the string shown in equation (1), as well as L key set identifiers (KSI) $k^L$ corresponding thereto.

The RAN node CP 310 provides 1102 the DRB 480 security configuration to be applied to a given PDU session to the RAN node UP 320 associated with such session. The configuration may include, without limitation, the cryptographic algorithm selected by the RAN node CP 310, the plurality of derived set of UP keys ($K^L$up-enc and/or $K^L$up-int), the plurality of key set identifiers $k^L$ corresponding to each of the L sets of UP keys; a maximum period of time that a given key set can be used; whether encryption is enabled for the DRB 480 and/or whether integrity protection is enabled for the DRB 480. In some examples, the cryptographic algorithm is selected by the RAN node CP 310 based on, without limitation, the capabilities of the WD 340, the capabilities of the RAN node UP 320; the PDU session security policies provided by the CN and/or local RAN node 300 security policies, which in some examples may have been configured by the MNO.

The RAN node UP 320 uses an initial set of UP keys ($K^1$up-enc and/or $K^1$up-int) and a corresponding key set identifier $k^1$ from the received configuration to initialize 1103 a PDCP instance and resets the DL COUNT value for the DRB 480 corresponding thereto.

The RAN node CP 310 provides 1104 the WD 340 with the DRB 480 security configuration to be applied to the DRB(s) 480 of the appropriate PDU session. In some examples, the configuration may include, without limitation, the cryptographic algorithm selected by the RAN node CP 310; the current value of NCC; a connection identity; the key set identifier $k^1$ for the initial set of UP keys; a maximum period of time that a given key set can be used; whether encryption is enabled for the DRB 480 and/or whether integrity protection is enabled for the DRB 480.

The WD 340 uses the received configuration and the temporal master key (KgNB) 810 indicated by the current value of NCC to derive 1105 a set of UP keys ($K^1$up-enc and/or $K^1$up-int) corresponding to the key set identifier $k^1$, initializes a PDCP instance and resets the UL COUNT value for the DRB 480 corresponding thereto.

Thereafter, there may be one or more UL 1106 and/or DL 1107 UP transmissions of PDCP data PDUs 900 on the affected DRB(s) 480 using the UP keys associated with the key set identifier k.

At some point in time, the RAN node UP 320 determines 1108 that a key change is appropriate. In some examples, without limitation, the key change may be based upon detection of a corresponding event (including, without limitation, exhaustion of the COUNT parameter and/or expiry of a lifetime timer for the key $k^1$) by the RAN node UP 320. In other examples, the key change may be based upon an indication received by the RAN node UP 320 from the RAN node CP 310 or it may be based upon an indication received by the RAN node UP 320 from the WD 340.

Upon making 1108 the determination, the RAN node UP 320 selects an unused set of UP keys (Kup-enc* and/or Kup-int*) and a key set identifier k* corresponding thereto from the plurality of sets of UP keys received 1102 for the PDU session.

The RAN node UP 320 uses the selected key set to initialize 1108 a PDCP instance with the new UP key set and the key set identifier k* associated therewith and resets the DL COUNT value for the DRB 480 corresponding thereto. Thereafter, all DL transmissions of PDCP data PDUs 900 on the affected DRB(s) 480 use the newly-derived UP keys associated with the key set identifier k*. In some examples, the first such DL transmission 1109 may be considered to be a cryptographic key change PDU in that the change in the key set identifier k* signals for the first time to the WD 340 that the newly-derived UP keys are being used. The RAN node UP 320 remains prepared to process received UL transmissions of PDCP data PDUs 900 from the WD 340 using the UP key set associated with either the current key set identifier k or the new key set identifier k*.

When the WD 340 detects 1110 a key change indicator, such as a change in the DL key set identifier from k to k*, the WD 340 uses the temporal master key (KgNB) 810 indicated by the current value of NCC to derive a new set of UP keys (Kup-enc* and/or Kup-int*) corresponding to the key set identifier k*. The RAN node UP 320 may receive multiple sets of cryptographic keys derived by and sent from the RAN node CP 310, and autonomously coordinate the changeover in cryptographic keys with the WD 340. In a related variation, the WD 340 receives a key change indicator, such as an end marker DL PDCP control PDU 960 or an end marker DL PDCP data PDU 980, that contains the new key set identifier k*.

The WD 340 initializes 1110 a PDCP instance using the newly-derived set of UP keys corresponding to the key set identifier k* and resets the UL COUNT value for the DRB 480 corresponding thereto.

Thereafter, UL 1111 and/or DL 1109 UP transmissions of PDCP data PDUs 900 on the affected DRB(s) 480 use the newly-derived UP keys associated with the key set identifier k*.

In a second example mechanism, the RAN node UP 320 associated with a PDU session autonomously derives UP keys based on cryptographic keying material previously received from the RAN node CP 310. In the present disclosure, keying material includes information that identifies or derives cryptographic keys.

When a new set of UP keys is to be employed, the RAN node UP 320 communicates directly with the WD 340, via in-band UP signalling, to coordinate the changeover from the old UP key set to the new UP key set. This reduces the amount of CP signalling involved.

Figure 12:
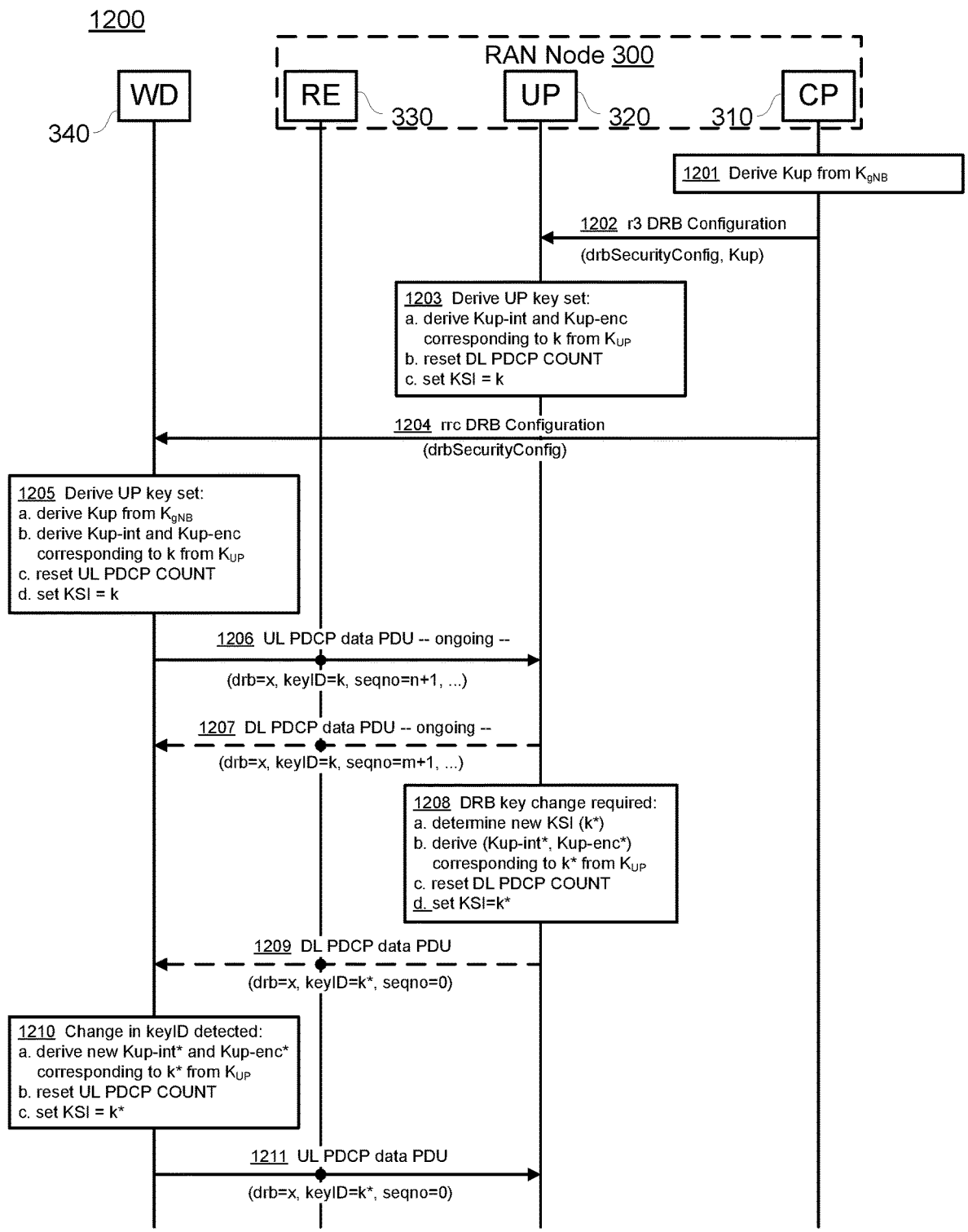
FIG. 12 is a signal flow diagram showing example signal flows by which a RAN node UP associated with a given session autonomously derives a set of UP cryptographic keys based on information conveyed to it by a RAN node CP according to an example.

The second example mechanism is described in the example signal flow diagram shown generally at 1200 in FIG. 12. The figure shows communications between a WD 340, a RAN node RE 330, a RAN node UP 320 and a RAN node CP 310.

When a PDU session is initially established 1201, the RAN node CP 310 uses the current temporal master key (KgNB) 810 to derive an intermediate UP key (Kup) 840 associated with the PDU session.

The RAN node CP 310 provides 1202 the DRB 480 security configuration to be applied to a given PDU session to the RAN node UP 320 associated with such PDU session. The configuration may include, without limitation, the cryptographic algorithm selected by the RAN node CP 310, the derived intermediate UP key (Kup), the key set identifier k corresponding to an initial set of UP keys; a maximum period of time that the intermediate UP key (Kup) can be used; a maximum period of time that a given key set can be used; whether encryption is enabled for the DRB 480 and/or whether integrity protection is enabled for the DRB 480. In some examples, the cryptographic algorithm is selected by the RAN node CP 310 based on, without limitation, the capabilities of the WD 340, the capabilities of the RAN node UP 320; the PDU session security policies provided by the CN and/or local RAN node 300 security policies, which in some examples may have been configured by the MNO.

The RAN node UP 320 uses the intermediate UP key (Kup) to derive an initial set of UP keys (Kup-enc 841 and/or Kup-int 842) and a corresponding key set identifier k. The RAN node UP 320 then initializes a PDCP instance and resets the DL COUNT value for the DRB 480 corresponding thereto.

The RAN node CP 310 provides 1204 the WD 340 with the DRB 480 security configuration to be applied to the DRB(s) 480 of the appropriate PDU session. In some examples, the configuration may include, without limitation, the cryptographic algorithm selected by the RAN node CP 310; the current value of NCC; a connection identity; the key set identifier k for the initial set of UP keys; a maximum period of time that a given key set can be used; whether encryption is enabled for the DRB 480 and/or whether integrity protection is enabled for the DRB 480.

The WD 340 uses the received configuration and the temporal master key (KgNB) 810 indicated by the current value of NCC to derive 1205 an intermediate UP key (Kup). The WD 340 then uses the intermediate UP key (Kup) to derive a set of UP keys (Kup-enc and/or Kup-int) corresponding to the key set identifier k, initializes a PDCP instance and resets the UL COUNT value for the DRB 480 corresponding thereto.

Thereafter, there may be one or more UL 1206 and/or DL 1207 UP transmissions of PDCP data PDUs 900 on the affected DRB(s) 480 using the UP keys associated with the key set identifier k.

At some point in time, the RAN node UP 320 determines 1208 that a key change is appropriate. In some examples, without limitation, the key change may be based upon detection of a corresponding event (including, without limitation, exhaustion of the COUNT parameter and/or expiry of a lifetime timer for the key k). In other examples, the key change may be based upon an indication received by the RAN node UP 320 from the RAN node CP 310 or it may be based upon an indication received by the RAN node UP 320 from the WD 340.

Upon making 1208 the determination, the RAN node UP 320 uses the intermediate UP key (Kup) to derive a new set of UP keys (Kup-enc* and/or Kup-int*) and a key set identifier k* corresponding thereto for the session.

RAN node UP 320 uses the updated configuration to initialize 1209 a PDCP instance with the new UP key set and the key set identifier k* associated therewith and resets the DL COUNT value for the DRB 480 corresponding thereto. Thereafter, all DL UP transmissions of PDCP data PDUs 900 on the affected DRB(s) 480 use the newly-derived UP keys associated with the key set identifier k*. In some examples, the first such DL UP transmission 1209 may be considered to be a cryptographic key change PDU in that the change in the key set identifier k* signals for the first time to the WD 340 that the newly-derived UP keys are being used. The RAN node UP 320 remains prepared to process received UL transmissions of PDCP data PDUs 900 from the WD 340 using the UP key set associated with either the current key set identifier k or the new key set identifier k*.

When the WD 340 detects 1210 a key change indicator, such as a change in the DL key set identifier from k to k*, it uses the intermediate UP key (Kup) indicated by the current value of NCC to derive a new set of UP keys (Kup-enc* and/or Kup-int*) corresponding to the key set identifier k*. The RAN node UP 320 may derive the second cryptographic key set based on an intermediate key provided by the RAN node CP 310 and autonomously coordinate the change with the WD 340. In a related variation, the WD 340 receives a key change indicator such as an end marker DL PDCP control PDU 960 or an end marker DL PDCP data PDU 980 that contains the new key set identifier k*.

The WD 340 initializes 1211 a PDCP instance using the newly-derived set of UP keys corresponding to the key set identifier k* and resets the UL COUNT value for the DRB 480 corresponding thereto.

Thereafter, UL and/or DL UP transmissions of PDCP data PDUs 900 on the affected DRB(s) 480 use the newly-derived UP keys associated with the key set identifier k*.

In some examples, a change in the UP keys used for UL UP transmission mandates a change in the UP keys used for DL UP transmission and a change in the UP keys used for DL UP transmission mandates a change in the UP keys used for UL transmission.

In some examples, a change in the UP keys used for UL UP transmission does not mandate a change in the UP keys used for DL UP transmission and a change in the UP keys used for DL UP transmission does not mandate a change in the UP keys used for UL UP transmission. This may be useful in scenarios where the volume of UP traffic in one direction (by way of non-limiting example, the DL direction) greatly exceeds the volume of UP traffic flowing in the other direction (by way of non-limiting example, the UL direction). In such scenarios, there will be a faster changeover of keys in the direction in which the volume of traffic is greater, and the COUNT sequence number space may be exhausted more rapidly. Since the UP key used to protect a PDCP data PDU 900 is indicated by the key identifier field 910 in the PDCP header 950, DL UP transmissions may continue to use a key set that is different from the key set used for UL UP transmissions and/or vice versa.

In some examples, the RAN topology and/or mobile network operator (MNO) security policies may suggest the use of the first and/or the second example mechanisms. By way of non-limiting example, if the RAN node CP 310 is located in a secured environment, such as, without limitation, an MNO data centre, and the RAN node UP 320 associated with a given PDU session is located in an unsecured environment, such as, without limitation, a remote base station, the first example mechanism may be employed. On the other hand, again by way of non-limiting example, if the RAN node CP 310 is located in an unsecured environment, such as, without limitation, a remote base station, and the RAN node UP 320 associated with a given PDU session is located in a secured environment, such as, without limitation, an MNO data centre, the second example mechanism may be employed.

In a network where there are multiple RAN node UPs 320 deployed within a given RAN node 300, a RAN node UP 320 may be dedicated to a particular (type of) PDU session. In some examples, without limitation, the first and/or second example mechanism may be employed dynamically, without limitation, by the RAN node CP 310, based on the type of PDU session and/or based on security policies received from the CN during establishment of the PDU session.

In some examples, the first and/or second example mechanism may be dictated by the capabilities of the RAN node CP 310 and/or of the RAN node UP 320 and/or by a vendor implementation of a RAN node 300.

In some examples, a change in the UP key set may also result from a change in the cell that is currently serving the WD 340. Typically, the temporal master key (KgNB) 810 (which may be derived from the PCI and/or RFCN of the serving cell as shown in FIG. 7) may be changed when the WD 340 is handed over to a new cell since a new temporal master key (KgNB*) will be produced given that the PCI and/or the RFCN will have changed as a consequence of the handover.

Figure 13:
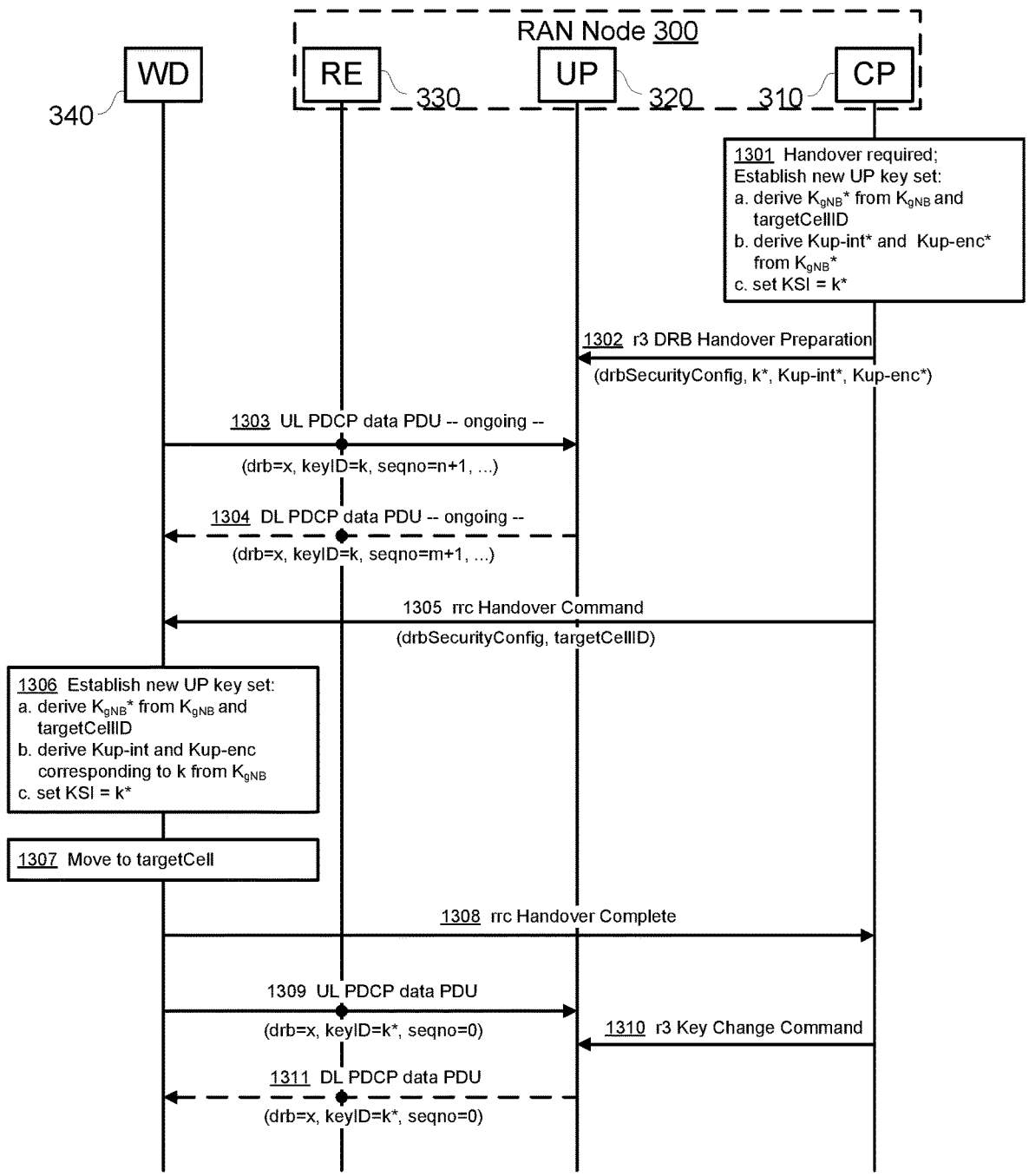
FIG. 13 is a signal flow diagram showing example signal flows by which a set of UP cryptographic keys may be changed as a result of an intra-RAN node handover as a result of a change in the cell that is currently serving a WD, according to an example.

Such a scenario may result in a third example mechanism corresponding to an intra-RAN node handover that is described in the example signal flow diagram shown generally at 1300 in FIG. 13. The figure shows communications between a WD 340, a RAN node RE 330, a RAN node UP 320 and a RAN node CP 310.

When a handover is appropriate 1301, the RAN node CP 310 uses the current temporal master key (KgNB) 810 to derive a new temporal master key (KgNB*) based on the identity of the (target) cell to which the WD 340 is going to be handed over. The RAN node CP 310 then uses the new temporal master key (KgNB*) to derive a new set of UP keys (Kup-enc* and/or Kup-int*) and the key set identifier k* corresponding thereto. In some examples, a new set of CP keys may also be derived.

The RAN node CP 310 provides 1302 the DRB 480 security configuration to be applied following completion of handover to the RAN node UP 320 associated with a given PDU session of the WD 340. The configuration may include, without limitation, the cryptographic algorithm selected by the RAN node CP 310, one or more sets of new UP keys (Kup-enc* and/or Kup-int*), the key set identifier(s) k* corresponding to each of the sets of new UP keys; a maximum period of time that a given key set can be used; whether encryption is enabled for the DRB 480 and/or whether integrity protection is enabled for the DRB 480. The RAN node UP 320 stores the received configuration but does not immediately apply it, pending completion of the handover.

Concurrently, there may be one or more UL 1303 and/or DL 1304 UP transmissions of PDCP data PDUs 900 on the affected DRB(s) 480 using the UP keys associated with the key set identifier k.

The RAN node CP 310 instructs 1305 the WD 340 to hand over to the target cell and in some examples provides the WD 340 with an updated DRB security configuration to be applied to the DRB(s) 480 after completion of the handover.

The WD 340 uses the received configuration and the current temporal master key (KgNB) to derive 1306 a new temporal master key (KgNB*) based on the identity of the (target) cell to which the WD 340 is going to be handed over. The WD 340 then uses the new temporal master key (KgNB*) to derive a new set of UP keys (Kup-enc* and/or Kup-int*) and the key set identifier k* corresponding thereto. In some examples, a new set of CP keys may also be derived.

After synchronising with the target cell, the WD 340 initializes 1307 a PDCP instance for each DRB 480 using the newly-derived set of UP keys corresponding to the key set identifier k* and resets the UL COUNT value for the corresponding DRB 480 corresponding thereto. In some examples, the WD 340 may also initialize a PDCP instance for each SRB 470 using the newly-derived set of CP keys.

The WD 340 informs 1308 the RAN node CP 310 acknowledgement in the form of a confirmatory PDU of a successful handover using a CP message. In some examples, the CP message is cryptographically protected using the newly-derived set of CP keys.

Thereafter, UL UP transmissions of PDCP data PDUs 900 on the affected DRB(s) 480 use 1309 the newly-derived UP keys associated with the key set identifier k*.

If the RAN node UP 320 receives an UL UP transmission of a PDCP data PDU 900 using the newly-derived UP keys associated with the key set identifier k* 1309, the RAN node UP 320 applies the newly-derived UP keys associated with the key set identifier k* to all subsequent DL UP transmissions 1311 of PDCP data PDUs 900. In some examples, the first such UL transmission 1309 may be considered to be a cryptographic key change PDU. In a related variation, the RAN node UP 320 receives a key change indicator such as an end marker UL PDCP control PDU 960 or an end marker UL PDCP data PDU 980 that contains the new key set identifier k*.

In some examples, the WD 340 may not have an UL data queued for transmission at the time of completion of the handover 1307. As such, the RAN node CP 310 may instruct 1310 the RAN node UP 320 to change over to the newly-derived UP key set provided 1302 by the RAN node CP 310.

If the RAN node UP 320 has not previously received an UL UP transmission of a PDCP data PDU 900 using the newly-derived UP keys associated with the key set identifier k* 1309, the RAN node UP 320 applies the newly-derived UP keys associated with the key set identifier k* to all subsequent DL UP transmissions 1311 of PDCP data PDUs 900. In some examples, the first such DL transmission 1311 may be considered to be a cryptographic key change PDU. In a related variation, the RAN node UP 320 transmits a key change indicator such as an end marker DL PDCP control PDU 960 or an end marker DL PDCP data PDU 980 that contains the new key set identifier k*.

Thereafter, all DL and UL UP transmissions of PDCP data PDUs 900 on the affected DRB(s) 480 use the newly-derived UP keys associated with the key set identifier k*.

Method Actions

Figure 14:
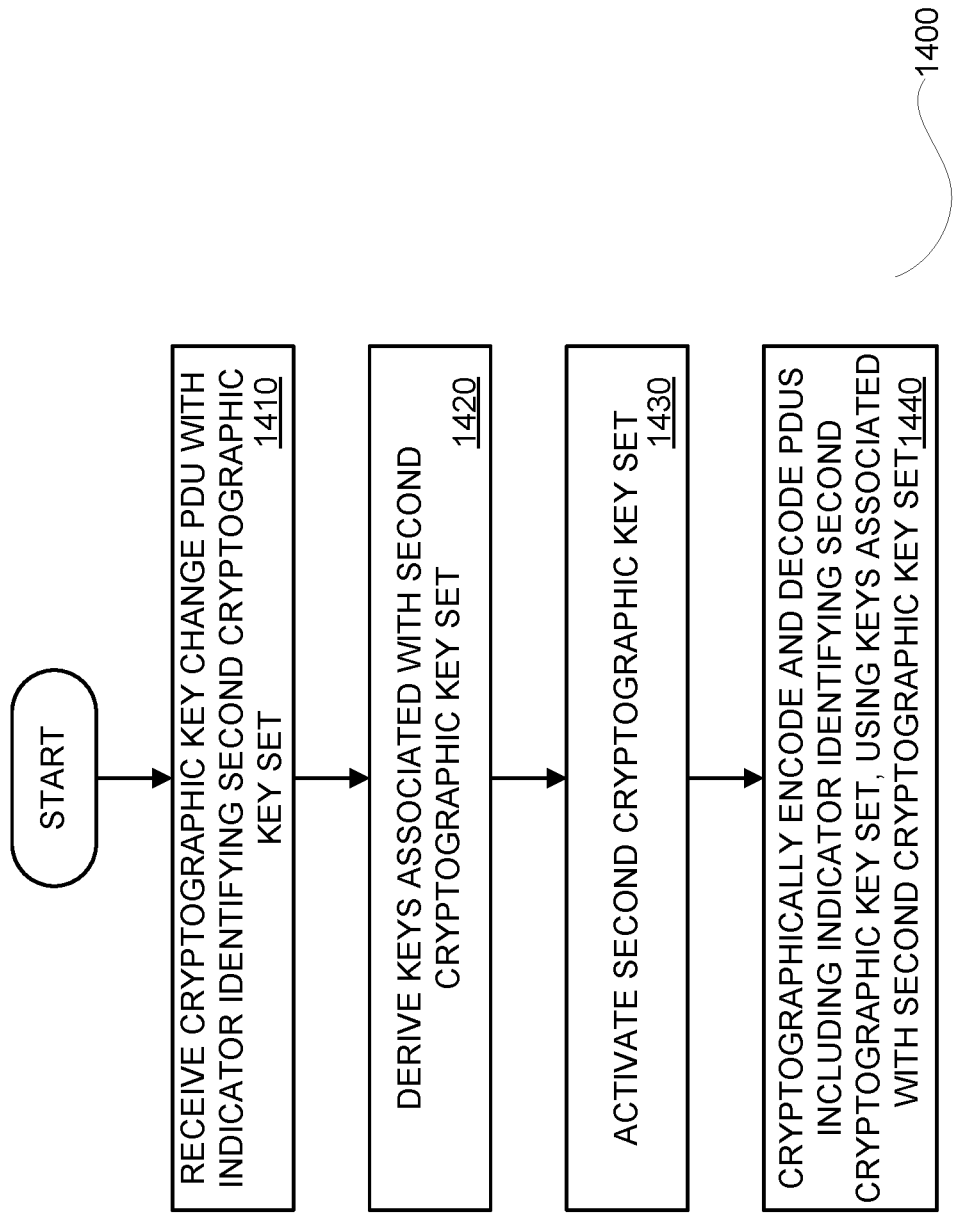
FIG. 14 is a flow chart illustrating an example of a method at a WD for coordinating a change of cryptographic key sets according to an example.

Turning now to FIG. 14, there is shown a flow chart, shown generally at 1400, of example actions taken at the WD 340 for coordinating a change in cryptographic key sets for cryptographically protecting PDUs exchanged with the RAN node UP 320. Prior to the change, the PDUs are cryptographically protected by a first cryptographic key set.

One example action 1410 is to receive, from the RAN node 300, a cryptographic key change PDU comprising an indicator identifying a second cryptographic key set by which PDUs are to be cryptographically protected subsequently.

One example action 1420 is to derive keys associated with the second cryptographic key set.

One example action 1430 is to activate the second cryptographic key set.

One example action 1440 is to cryptographically encode PDUs for transmission to the RAN node UP 320 and to cryptographically decode PDUs received from the RAN node UP 320 using keys associated with the second cryptographic key set. The PDUs include an indicator identifying the second cryptographic key set.

Figure 15:
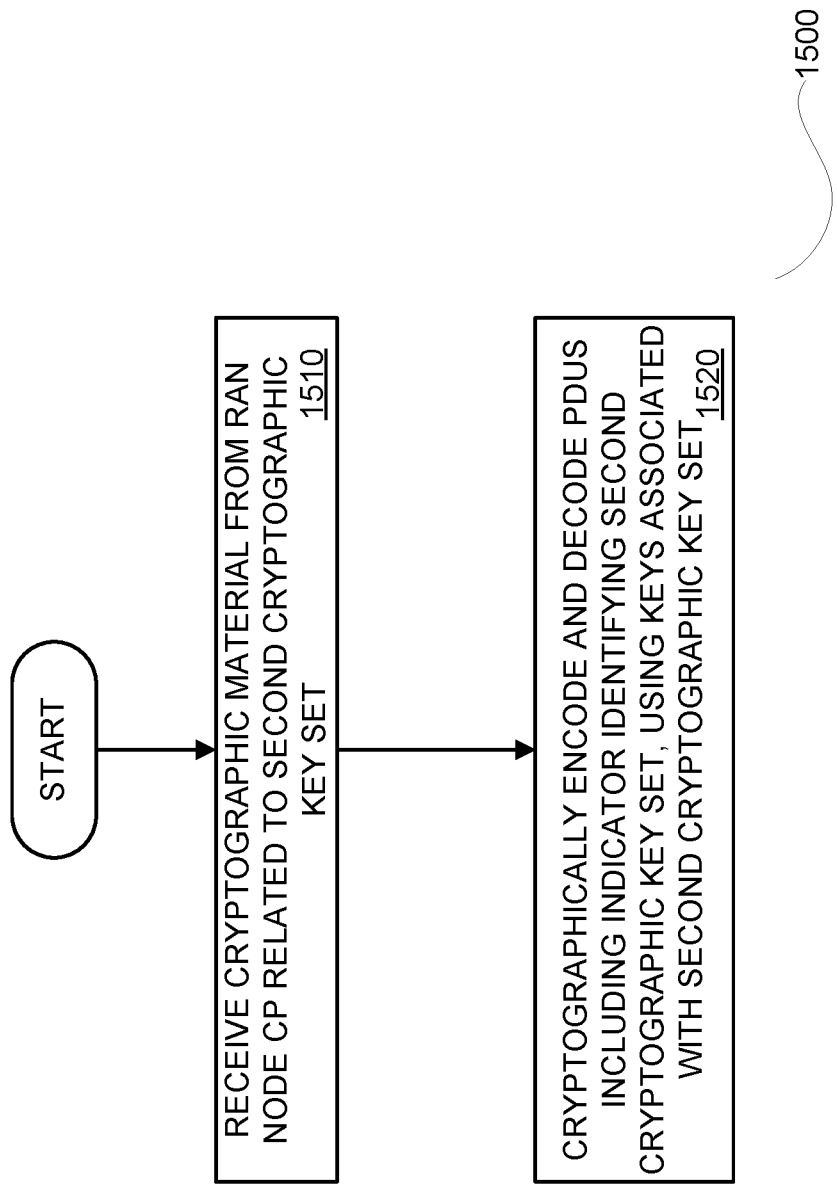
FIG. 15 is a flow chart illustrating an example of a method at a RAN node UP for coordinating a change of cryptographic key sets according to an example.

Turning now to FIG. 15, there is shown a flow chart, shown generally at 1500, of example actions taken at the RAN node UP 320 for coordinating a change in cryptographic key sets for cryptographically protecting PDUs exchanged with the WD 340. Prior to the change, the PDUs are cryptographically protected by a first cryptographic key set.

One example action 1510 is to receive from the RAN node CP 310, cryptographic keying material related to a second cryptographic key set by which PDUs are to be cryptographically protected subsequently.

One example action 1520 is to cryptographically encode PDUs for transmission to the WD 340 and cryptographically decode PDUs received from the WD 340 using keys associated with the second cryptographic key set. The PDUs include an indicator identifying the second cryptographic key set.

Figure 16:
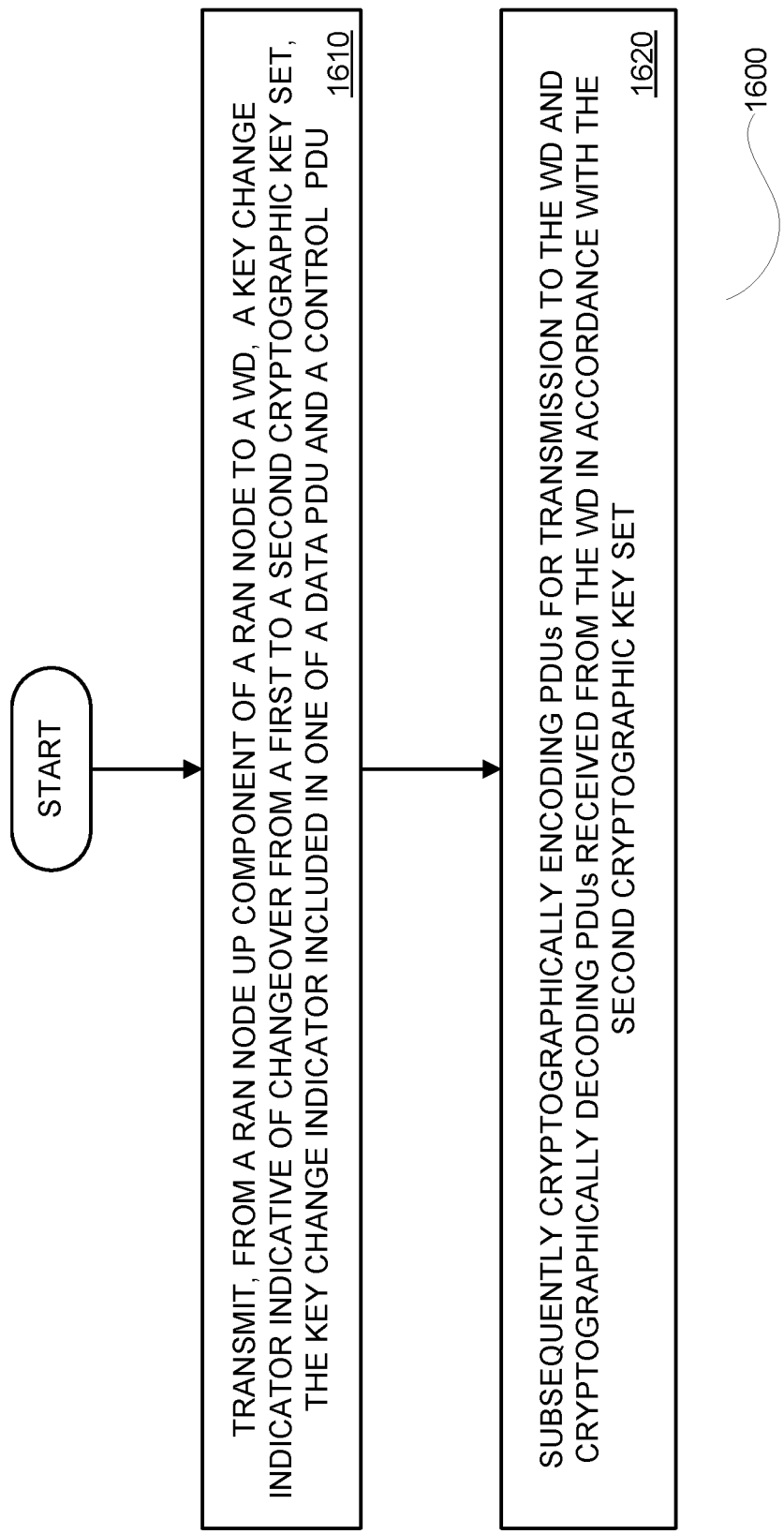
FIG. 16 is a flow chart illustrating an example of a method at a RAN node UP component for coordinating a change of cryptographic key sets according to a further example.

Turning now to FIG. 16, there is shown a flow chart, shown generally at 1600, of example actions taken at the RAN node UP 320 for coordinating a change in cryptographic key sets for cryptographically protecting PDUs exchanged with the WD 340. Prior to the change, the PDUs are cryptographically protected by a first cryptographic key set.

One example action 1610 is to transmit, from the RAN node UP 320 to the WD 340, a key change indicator indicative of changeover to the second cryptographic key set, the key change indicator included in one of a data protocol data unit (PDU) and a control PDU.

One example action 1620 is for the RAN node UP 320 to subsequently cryptographically encode PDUs for transmission to the WD 340 and cryptographically decode PDUs received from the WD 340 in accordance with the second cryptographic key set.

Figure 17:
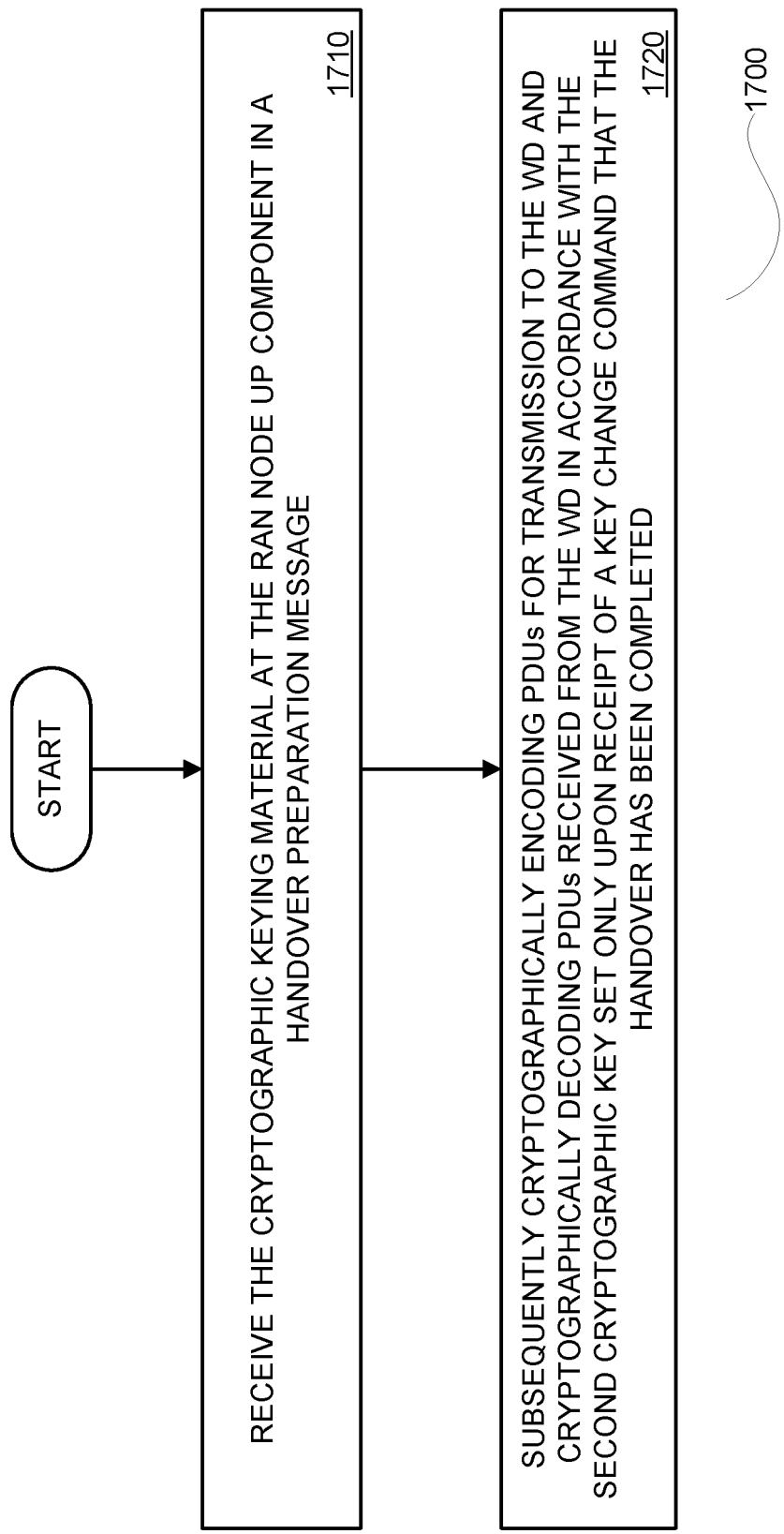
FIG. 17 is a flow chart illustrating other example actions taken at the RAN node UP component for coordinating a change in cryptographic key sets according to another example.

With regard now to FIG. 17, there is shown a flow chart, shown generally at 1700, of other example actions taken at the RAN node UP 320 for coordinating a change in cryptographic key sets for cryptographically protecting PDUs exchanged with the WD 340.

One example action 1710 is receive the cryptographic keying material at the RAN node UP 320 in a handover preparation message.

One example action 1720 is for the RAN node UP 320 to subsequently cryptographically encode and decode PDUs received from the WD 340 in accordance with the second cryptographic key set only upon receipt of a key change command that the handover has been completed.

Terminology

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether optically, electrically, mechanically, chemically, or otherwise.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

General

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that the present disclosure, which can be modified by omitting, adding or replacing elements with equivalent functional elements, provides many applicable inventive concepts that may be embodied in a wide variety of specific contexts. The specific embodiments discussed are merely illustrative of specific ways to make and use the concepts disclosed herein, and do not limit the scope of the present disclosure. Rather, the general principles set forth herein are considered to be merely illustrative of the scope of the present disclosure.

It will be apparent that various modifications and variations covering alternatives, modifications and equivalents will be apparent to persons having ordinary skill in the relevant art upon reference to this description and may be made to the embodiments disclosed herein, without departing from the present disclosure, as defined by the appended claims.

Accordingly the specification and the embodiments disclosed therein are to be considered examples only, with a true scope of the disclosure being disclosed by the following numbered claims:

What is claimed is:

1. A user plane (UP) component of a radio access network (RAN) node of a Public Land Mobile Network (PLMN) serving a wireless device (WD), the RAN node further having a control plane (CP) component, the the UP component being instantiated in a different location of the PLMN than the CP component and comprising:
    a processor;
    a non-transitory memory storing instructions that when executed by the processor cause the UP component to coordinate a change in cryptographic key sets from a first cryptographic key set to a second cryptographic key set by:
    transmitting, to the WD, a key change indicator indicative of changeover to the second cryptographic key set, the key change indicator included in one of a user plane data protocol data unit (PDU) and a user plane control PDU; and
    subsequently cryptographically encoding PDUs for transmission to the WD and cryptographically decoding PDUs received from the WD in accordance with the second cryptographic key set.

2. The user plane component of claim 1, wherein the key change indicator comprises the user plane data PDU and a key set identifier indicative of the second cryptographic key set included in a header field of the user plane data PDU.

3. The user plane component of claim 1, wherein the key change indicator comprises the user plane control PDU, the user plane control PDU including one or more of: a key set identifier indicative of the second cryptographic key set; and an indication of sequence numbers of data PDUs protected with the first cryptographic key set and sequence numbers of data PDUs protected with the second cryptographic key set.

4. The user plane component of claim 1, wherein the key change indicator comprises a pre-determined sequence number in a sequence number field of the user plane data PDU, the user plane data PDU interposed as a marker between user plane data PDUs associated with the first cryptographic key set and user plane data PDUs to be associated with the second cryptographic key set.

5. The user plane component of claim 1, wherein the cryptographically encoding and cryptographically decoding in accordance with the second cryptographic key set is performed only upon receipt of a key change command from the CP component indicating that the cryptographic keying material related to the second cryptographic key set has been communicated to the WD by the CP component.

6. The user plane component of claim 1, wherein prior to transmitting the key change indicator, the UP component is configured to receive, from the CP component of the RAN node, cryptographic keying material related to the second cryptographic key set.

7. The user plane component of claim 1, wherein the UP component derives the second cryptographic key set based on an intermediate key provided by the CP component of the RAN node and autonomously coordinates the changeover to the second cryptographic key set with the WD.

8. The user plane component of claim 1, wherein the UP component receives the second cryptographic key set from the CP component, and the UP component and the WD are responsive to coordination, by the CP component, of the changeover to the second cryptographic key set.

9. The user plane component of claim 1, wherein UP component receives multiple sets of cryptographic keys derived by and sent from the CP component, and the UP component autonomously coordinates the changeover to the second cryptographic key set with the WD, the second cryptographic key set selected, by the UP component, from the multiple sets of cryptographic keys received from the CP component.

10. The user plane component of claim 1, wherein the memory further stores instructions that when executed by the processor cause the UP component of the network element to transmit, to the CP component, an indication that the UP component has activated the second cryptographic key set.

11. A method of coordinating a change in cryptographic key sets from a first cryptographic key set to a second cryptographic key set between a radio access network (RAN) node of a Public Land Mobile Network (PLMN) and a wireless device (WD) served by the RAN node, the RAN node comprising a user plane (UP) component and a control plane (CP) component, the method comprising, by the UP component which is instantiated in a different location of the PLMN than the CP component:
  transmitting, from the UP component to the wireless device (WD), a key change indicator indicative of changeover to the second cryptographic key set, the key change indicator included in one of a user plane data protocol data unit (PDU) and a user plane control PDU; and
  subsequently cryptographically encoding PDUs for transmission to the WD and cryptographically decoding PDUs received from the WD in accordance with the second cryptographic key set.

12. The method of claim 11, wherein the key change indicator comprises the user plane data PDU and a key set identifier indicative of the second cryptographic key set included in a header field of the user plane data PDU.

13. The method of claim 11, wherein the key change indicator comprises the user plane control PDU, the user plane control PDU including one or more of: a key set identifier indicative of the second cryptographic key set; and an indication of sequence numbers of data PDUs protected with the first cryptographic key set and sequence numbers of data PDUs protected with the second cryptographic key set.

14. The method of claim 11, wherein the key change indicator comprises a pre-determined sequence number in a sequence number field of the user plane data PDU, the user plane data PDU interposed as a marker between user plane data PDUs associated with the first cryptographic key set and user plane data PDUs to be associated with the second cryptographic key set.

15. The method of claim 11, wherein the cryptographically encoding and cryptographically decoding in accordance with the second cryptographic key set is performed only upon receipt of a key change command from the CP component indicating that the cryptographic keying material related to the second cryptographic key set has been communicated to the WD by the CP component.

16. The method of claim 11, wherein prior to transmitting the key change indicator, the UP component receives, from the CP component, cryptographic keying material related to the second cryptographic key set.

17. The method of claim 11, wherein the UP component derives the second cryptographic key set based on an intermediate master key provided by the CP component and autonomously coordinates the changeover to the second cryptographic key set with the WD.

18. The method of claim 11, wherein the UP component receives the second cryptographic key set from the CP component, and the UP component and the WD are responsive to coordination, by the CP component, of the changeover to the second cryptographic key set.

19. The method of claim 11, wherein the UP component receives multiple sets of cryptographic keys derived by and sent from the CP component, and the UP component autonomously coordinates the changeover to the second cryptographic key set with the WD, the second cryptographic key set selected, by the UP component, from the multiple sets of cryptographic keys received from the CP component.

20. The method of claim 11, further comprising transmitting, to the CP component, an indication that the UP component has activated the second cryptographic key set.

21. A wireless device (WD) for exchanging protocol data units (PDUs) with a radio access network (RAN) node of a Public Land Mobile Network (PLMN), the WD comprising:
  a processor;
  a non-transitory memory storing instructions that when executed by the processor cause the WD to coordinate a change from a first cryptographic key set to a second cryptographic key set by:
  receiving, from a user plane (UP) component of the RAN node, a key change indicator indicative of changeover to the second cryptographic key set, the key change indicator included in one of a user plane data protocol data unit (PDU) and a user plane control PDU;
  activating the second cryptographic key set in accordance with the key change indicator; and
  cryptographically encoding PDUs for transmission to the UP component of the RAN node and cryptographically decoding PDUs received from the UP component of the RAN node in accordance with the second cryptographic key set, the RAN node comprising the UP component instantiated in the PLMN and a control plane (CP) component instantiated at a different location of the PLMN than the UP component.

22. The WD of claim 21, wherein the key change indicator comprises the user plane data PDU and a key set identifier indicative of the second cryptographic key set included in a header field of the user plane data PDU.

23. The WD of claim 21, wherein the key change indicator comprises the user plane control PDU, the user plane control PDU including one or more of: a key set identifier indicative of the second cryptographic key set; and an indication of sequence numbers of data PDUs protected with the first cryptographic key set and sequence numbers of data PDUs protected with the second cryptographic key set.

24. The WD of claim 21, wherein the key change indicator comprises a pre-determined sequence number in a sequence number field of the user plane data PDU, the user plane data PDU interposed as a marker between user plane data PDUs associated with the first cryptographic key set and user plane data PDUs to be associated with the second cryptographic key set.

25. The WD of claim 21, wherein the activating comprises initializing a new packet data convergence protocol (PDCP) instance with the second cryptographic key set.

26. The WD of claim 21, wherein the activating comprises sending a confirmatory PDU to the CP component of the RAN node indicating that the WD has derived the keys associated with the second cryptographic key set.

* * * * *